(12) United States Patent
McBride et al.

(10) Patent No.: US 11,591,135 B1
(45) Date of Patent: Feb. 28, 2023

(54) CANISTER LID WITH OVERMOLDED GASKET PROVIDING A NON-SLIP SURFACE

(71) Applicant: InterDesign, Inc., Solon, OH (US)

(72) Inventors: Sara Czukal McBride, Wickliffe, OH (US); Terry Michael Bailey, Ravenna, OH (US); Radu Alexandru Ghiorghie, Copley, OH (US); Frank Curtis Kraska, Concord Township, OH (US)

(73) Assignee: InterDesign, Inc., Solon, OH (US)

( * ) Notice: Subject to any disclaimer, the term of this patent is extended or adjusted under 35 U.S.C. 154(b) by 82 days.

(21) Appl. No.: 16/939,483

(22) Filed: Jul. 27, 2020

Related U.S. Application Data

(63) Continuation-in-part of application No. 29/739,183, filed on Jun. 23, 2020.

(60) Provisional application No. 62/987,020, filed on Mar. 9, 2020, provisional application No. 62/947,619, filed on Dec. 13, 2019, provisional application No. 62/878,811, filed on Jul. 26, 2019.

(51) Int. Cl.
| | | |
|---|---|---|
| *B65D 21/02* | (2006.01) |
| *B29C 70/80* | (2006.01) |
| *B65D 53/02* | (2006.01) |
| *B29L 31/56* | (2006.01) |
| *B29K 667/00* | (2006.01) |
| *B29K 625/00* | (2006.01) |
| *B29K 101/12* | (2006.01) |
| *B29L 31/26* | (2006.01) |

(52) U.S. Cl.
CPC .......... *B65D 21/0223* (2013.01); *B29C 70/80* (2013.01); *B65D 53/02* (2013.01); *B29K 2101/12* (2013.01); *B29K 2625/06* (2013.01); *B29K 2667/003* (2013.01); *B29K 2995/007* (2013.01); *B29K 2995/0072* (2013.01); *B29L 2031/265* (2013.01); *B29L 2031/565* (2013.01)

(58) Field of Classification Search
CPC ............ B65D 21/0222; B65D 21/0223; B65D 2543/00564; B29C 70/80
See application file for complete search history.

(56) References Cited

U.S. PATENT DOCUMENTS

| | | | | |
|---|---|---|---|---|
| 4,051,951 A | * | 10/1977 | Smith ................ | B65D 21/0222 206/508 |
| 9,277,843 B2 | * | 3/2016 | Mays ................. | B65D 83/0805 |
| 2011/0315702 A1 | * | 12/2011 | LeBoeuf ............ | B65D 43/0208 220/793 |

* cited by examiner

*Primary Examiner* — Andrew T Kirsch
(74) *Attorney, Agent, or Firm* — Calfee, Halter & Griswold LLP

(57) ABSTRACT

A canister including a lid and storage canister. The lid incorporates a gasket that is overmolded onto the lid during its manufacture. The gasket is exposed on both the upper and lower surfaces of the lid in order to provide a non-slip surface at the top portion of the lid and a sealing surface at the bottom of the lid for sealing a storage canister.

18 Claims, 31 Drawing Sheets

CANISTER LID WITH OVERMOLDED GASKET PROVIDING A NON-SLIP SURFACE

CROSS-REFERENCE TO RELATED CASES

The application claims priority to, and any other benefit of, U.S. Prov'l Pat. Appl'n Ser. Nos. 62/878,811 filed on Jul. 26, 2019; 62/947,619 filed on Dec. 13, 2019; and 62/987,020 filed on Mar. 9, 2020, the entire disclosures of which are incorporated by reference as though recited herein in their entireties. This application is also a continuation-in-part of U.S. Pat. Appl'n Ser. No. 29/739,183 filed on Jun. 23, 2020, the entire disclosure of which is incorporated by reference as though recited herein in its entirety.

FIELD

The general inventive concepts relate generally to molded canister lids with integral gaskets.

BACKGROUND

Molded canister lids are known in the art and generally used to secure the contents of bins or canisters (used synonymously) to which the lids are attached. In circumstances where the interface between the lid and the canister is desired by be air or liquid tight, a gasket material is provided at the interface between the lid and the opening of the canister. Frequently canisters are stacked on top of another for storage purposes or when used to hold some sort of content. However, such stacked arrangements are susceptible to being inadvertently pushed apart and/or knocked over. In particular, a storage canister that is stacked on top of another storage canister could slip off the other canister, thereby causing injury and/or damaging valuable storage contents stored therein. Applicant has recognized a need for an interface between stacked storage canisters that resolves these known issues.

SUMMARY

In an exemplary embodiment, a storage canister lid comprises a body and an integral gasket, wherein the body comprises an upper surface and a lower surface, wherein the body has a plurality of first openings formed between the upper surface and the lower surface through which the gasket extends.

In an exemplary embodiment, a storage canister lid comprises a body and an overmolded portion, the overmolded portion having an upper horizontal portion forming a non-slip surface for an canister thereon and a lower portion having a cantilevered flange forming a seal with a lower canister sealed by the lid. In some exemplary embodiments, the body is transparent and forms a window inside of an annular upper horizontal portion forming the non-slip surface and the transparent body also provides a framework upon which the overmolded portion is overmolded.

In another exemplary embodiment, a lid to cover a first canister comprises: a body and an integral gasket; wherein an uppermost portion of the gasket and an upper portion of the lid body are horizontal in use and substantially coplanar; wherein an uppermost portion of the gasket and an upper portion of the lid body together form a substantially flat, upwardly-facing horizontal surface upon which a lower-most part of a second canister rests, the gasket being configured to provide a non-slip interface between the canister lid and the second canister; wherein a lip is formed on the lid body and is configured to define an upper depression, the upper depression being sized and configured to receive the lower-most part of the second canister such that canister lid does not grip the second canister when the second canister is placed on the canister lid; wherein the lid body comprises an upper surface and a lower surface; and wherein the lid body has a plurality of first openings formed between the upper surface and the lower surface through which the gasket extends.

In some exemplary embodiments, an exemplary method of forming a lid for a storage canister comprises positioning a lid into a mold, the lid comprising a plurality of openings between an upper and lower surface of the lid, and introducing a gasket material into the mold such that the gasket material forms a gasket having a lower portion with a lower surface and an upper portion with an upper surface, the gasket having a plurality of connectors disposed between the upper portion and the lower portion, wherein the plurality of connectors serve to connect the upper portion to the lower portion through the plurality of openings formed in the lid such that the upper portion and the lower portion of the gasket are held in position by the plurality of connectors.

In further exemplary embodiments, a storage canister comprises a canister which includes an upper sealing rim and a base with a protrusion formed adjacent to an outer edge of the base and extending from a lower surface of the base; a lid which comprises a body and a base with a protrusion formed adjacent to the outer edge of the base and extending from a lower surface of the base; a lid which comprises a body and an integral gasket, wherein the body comprises an upper surface and the lower surface, wherein a recess is formed in the lower surface which is adjacent to an edge of the body, the recess housing a portion of the gasket and being configured to cooperate with the upper sealing rim of the canister for sealing the canister, wherein the body has a plurality of first openings through which the gasket extends such that an upper surface of the gasket is exposed at the upper surface of the body and the lower surface of the gasket is exposed within the recess, and wherein the body further comprises a lip formed at the edge of the body and extending upward from the upper surface of the body, the upper surface of the gasket being exposed adjacent to the lip.

The above and other aspects and advantages of the general inventive concepts will become more readily apparent from the following description and figures, illustrating by way of example, the principles of the general inventive concepts.

An Appendix hereto shows unannotated FIGS. 15-26 and other figures. It is expected that this Appendix will be cancelled before the case issues, but it might be helpful in the meantime.

DETAILED DESCRIPTION

This detailed description merely describes exemplary embodiments of the invention and is not intended to limit the scope of the invention in any way. Indeed, the contemplated invention is broader than the exemplary embodiments. The terms used in any future claims have their full ordinary meaning unless an express definition is provided herein.

The present application discloses a storage canister system that comprises a canister and a lid. In exemplary embodiments, a channel (or corner) is formed on the underside of the lid and is configured to receive an upper portion of the canister. In exemplary embodiments, the gasket is partially located within the channel (or corner) and is also exposed at an upper surface of the lid. In some exemplary embodiments, the gasket is overmolded using a thermoplastic material (e.g., a thermoplastic elastomer (TPE), e.g., a TPE having a hardness of 70 durometer shore A) having a higher coefficient of friction than the plastic material used to mold the bin/canister and the lid (e.g., polyethylene terephthalate (PET)). In exemplary embodiments, the gasket is exposed at the top of the lid and is configured to provide a non-slip surface for a second canister that is placed on the lid. In such embodiments, this configuration permits storage canisters to be stacked while improving the stability of the stacked canisters (an upper canister is much less likely to slide off a lower lid on a lower canister).

Figure 1:
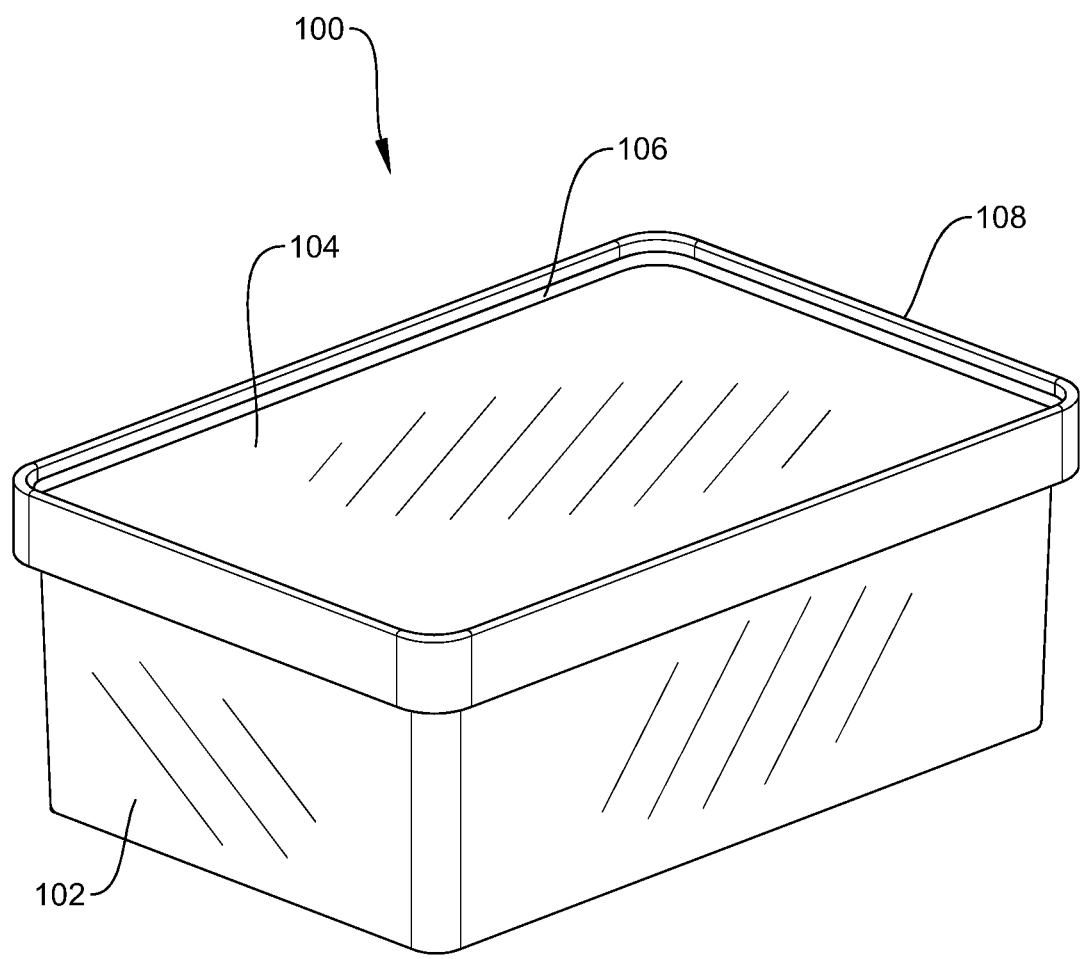
FIG. 1 illustrates a storage canister having a lid according to an exemplary embodiment.

FIG. 1 illustrates an exemplary embodiment of a storage canister 100. As shown, exemplary canister 100 comprises a canister 102 and a lid 104. In exemplary embodiments, and as discussed above, a gasket 106 is disposed in the lid 104 such that the gasket 106 is exposed at an upper surface of the lid 104. In exemplary embodiments, the lid 104 fits onto the canister 102 to secure contents stored therein. In some exemplary embodiments, a continuous lip 108 is formed along a periphery of the lid 104 adjacent to an exposed, upper surface of the gasket 106. In exemplary embodiments, the upper surface of the gasket 106 faces upward. In some exemplary embodiments, the upper surface of the gasket 106 faces upward and is substantially coplanar with (such as coplanar with or extending slightly above or below, e.g., extending 0-0.5 mm above or below) an upward facing portion of the lid 104, e.g., coplanar with a central portion of the lid (or extending 0-0.5 mm above or below the central portion of the lid). In some exemplary embodiments, the lid 104 lacks any flaps or levers, but still seals the canister via a snap fit configuration and an inside portion of the gasket 106.

Figure 2:
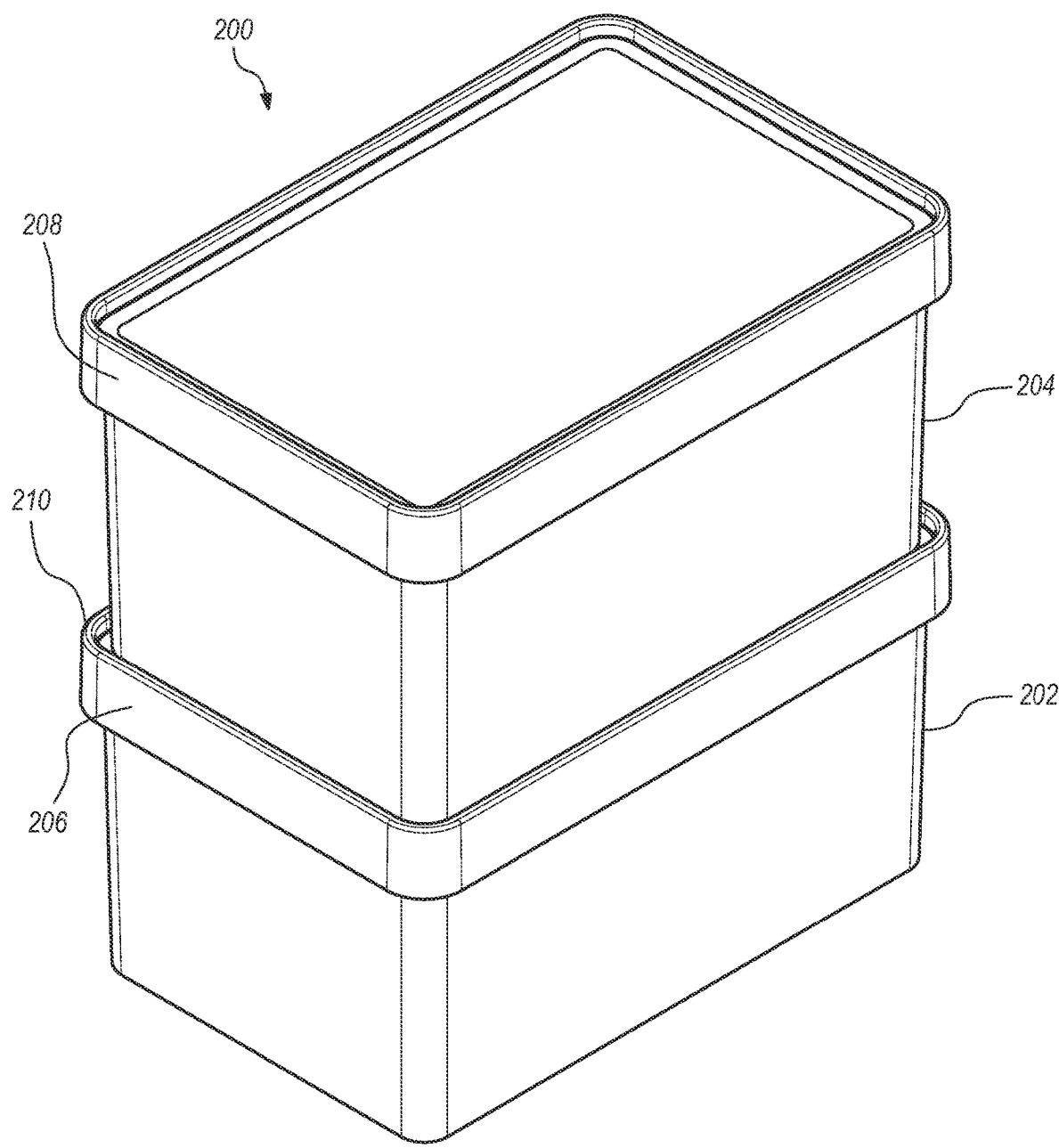
FIG. 2 shows a vertical stack of the storage canisters according to FIG. 1.

In some exemplary embodiments, the storage canisters according to the present application are often stacked on top of other storage canisters. FIG. 2 illustrates an exemplary stack 200 of a lower storage canister 202 and an upper storage canister 204. In exemplary embodiments, the lower storage canister 202 is fitted with a lower lid 206 and the upper storage canister 204 is fitted with an upper lid 208. As shown, in some exemplary embodiments, a lower portion of the upper storage canister 204 is placed on the lower lid 206 such that it is fits inside a recessed area defined by the lid flange 210 formed along the outer edge of the lower lid 206. In such exemplary embodiments, the lower portion of the upper storage canister 204 rests on at least a portion of the exposed gasket 106 (FIG. 1; not shown in FIG. 2) such that the gasket provides a higher coefficient of friction than would be provided by an interface between the upper storage canister 204 and the lower lid 206 without the gasket.

Figure 3A:
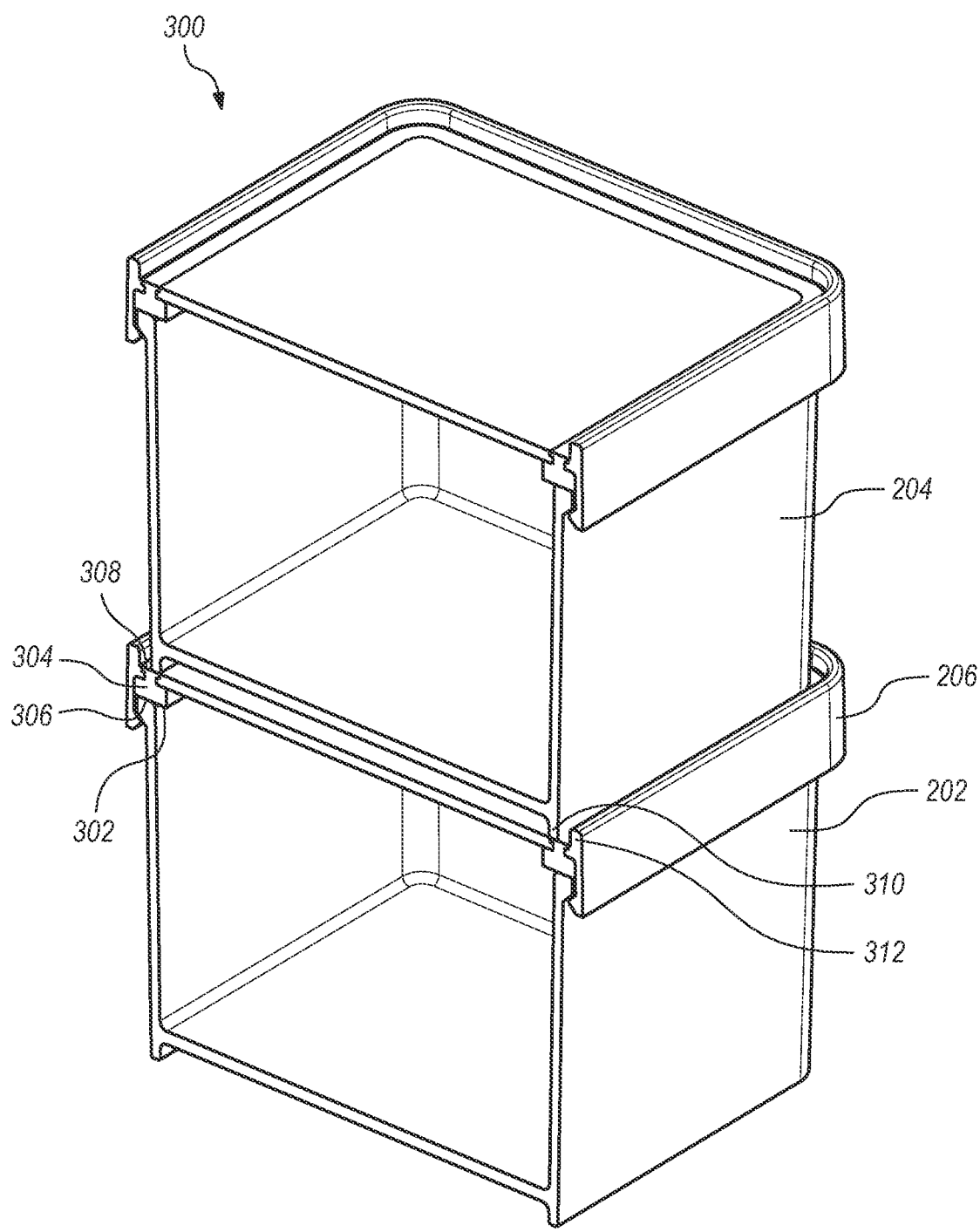
FIGS. 3a-3e show various cross-sectional views of the vertical stack of the canisters of FIG. 2, with FIG. 3b corresponding to the view of FIG. 3a and FIG. 3d corresponding to the view of FIG. 3c.
Figure 3B:
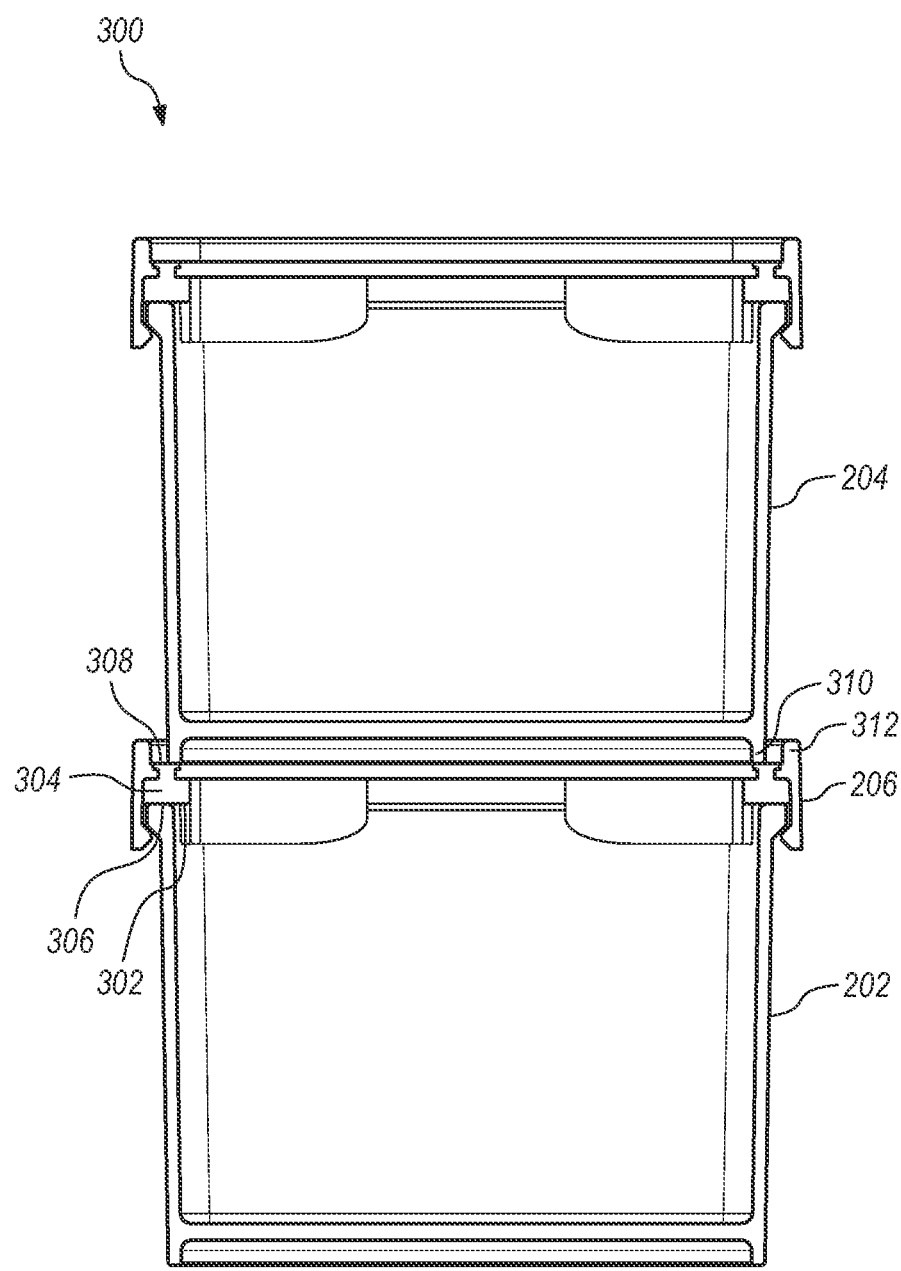
Figure 3C:
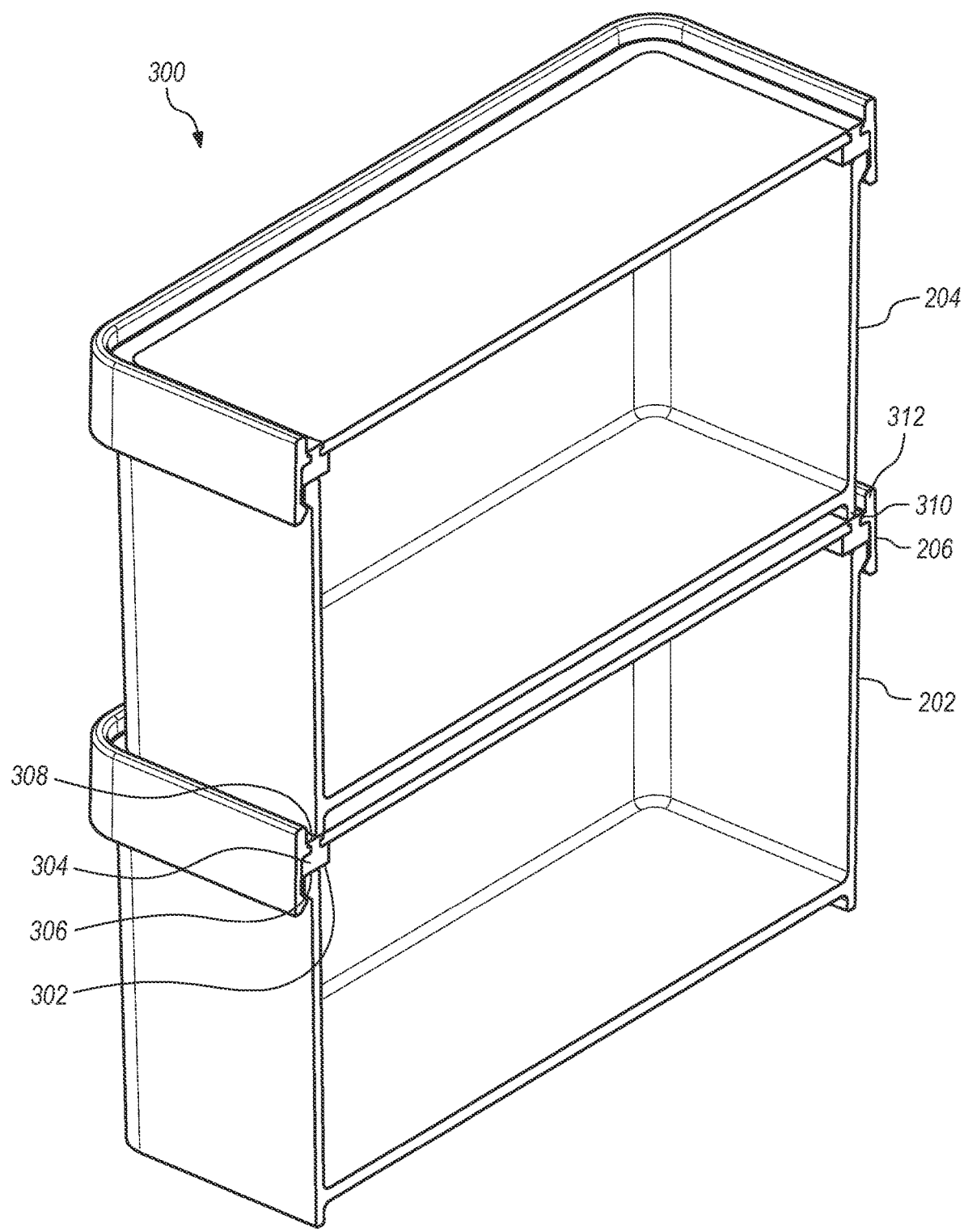
Figure 3D:
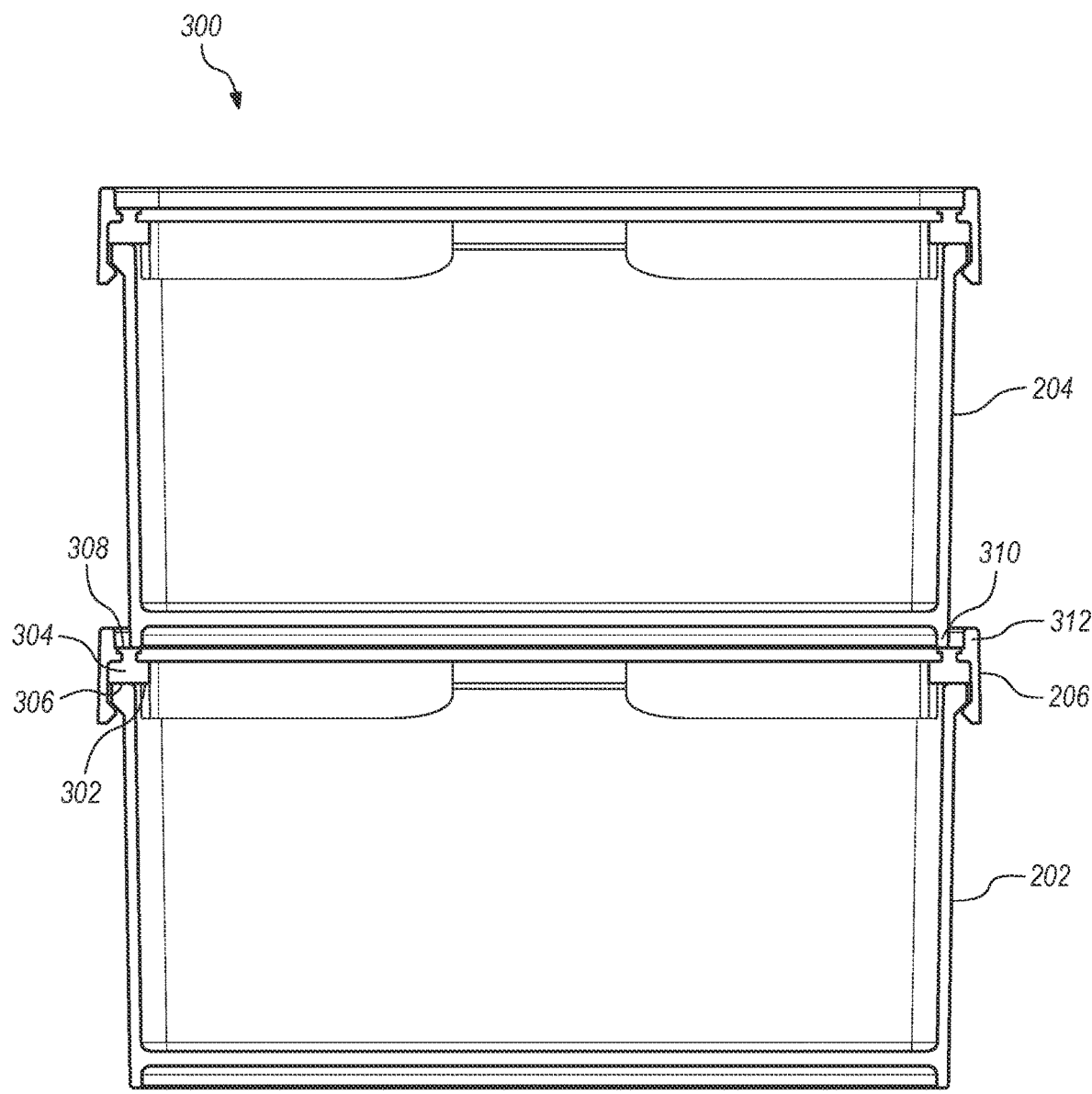

FIGS. 3a-d illustrate a cross-sectional view 300 of the exemplary stack 200 of storage canisters of FIG. 2. As illustrated by the sectional view of the lower lid 206, in some exemplary embodiments, a lower surface 302 of a gasket 304 contacts the upper edge 306 or rim of the lower storage canister 202 to provide a seal between the lower lid 206 and the lower storage canister 202, respectively, when the lower lid 206 is installed on the lower storage canister 202. In some exemplary embodiments, a top surface 308 of the gasket 304 is exposed at the upper surface of the lower lid 206. In exemplary embodiments, the top surface 308 of the gasket 304 is configured to contact a flange 310 formed on a lower portion of the upper storage canister 204 for preventing the upper canister from sliding off the lower canister 202. In some exemplary embodiments, a rim 312 is also formed on the lower lid 206 to prevent the upper canister 204 from sliding off the lower canister 202. This characteristic is likely to be very desirable for users that keep storage canisters stacked on shelves as it serves to minimize the likelihood that a canister will slide off another canister as they are being moved or taken off a shelf to retrieve their contents. In exemplary embodiments, and as discussed above, the canister has a downward-projecting flange 310 that engages the top surface 308 of the gasket 304. In some exemplary embodiments, the downward-projecting flange 310 forms a complete ring, e.g., 806 of FIG. 8. In some exemplary embodiments, the downward-projecting flange 310 is sized so that there is space between the rim 312 formed on the lower lid 206 and the downward-projecting flange 310 for enabling a user to more easily position a canister on the lower lid, e.g., a minimum dimensional tolerance for making stacking more ergonomically friendly. In some exemplary embodiments, the downward-projecting flange 310 is dimensioned such that the downward-projecting flange 310 contacts a portion of the top surface 308 of the gasket 304 irrespective of the exact stacking position of the upper canister 204 on the lower lid 206. For example, and as shown in FIGS. 3b and 3d, the downward-projecting flange 310 is configured to contact the top surface 308 of the gasket 304 along the entire perimeter of the lower lid 206. In some exemplary embodiments, the downward-projecting flange 310, the rim 312, and the top surface 308 of the gasket 304 are arranged such that if the upper canister 204 were to move to the farthest extents permitted by the interaction of the downward projecting flange 310 and the rim 312 (as is evident by the relationship between these two components visible in FIGS. 3a-3d), the downward-projecting flange 310 would still contact the top surface 308 of the gasket 304. For example, in such exemplary embodiments, the components are arranged and sized so that if upper canister 204 is slid to the far left in either FIG. 3b or FIG. 3d (or both), the downward-projecting flange 310 still contacts the gasket 304 on the left. Similarly, in such embodiments, the components are arranged and sized so that if upper canister 204 is slid to the far right in either FIG. 3b or FIG. 3d (or both), the downward-projecting flange 310 still contacts the gasket 304 on the right.

Figure 3E:
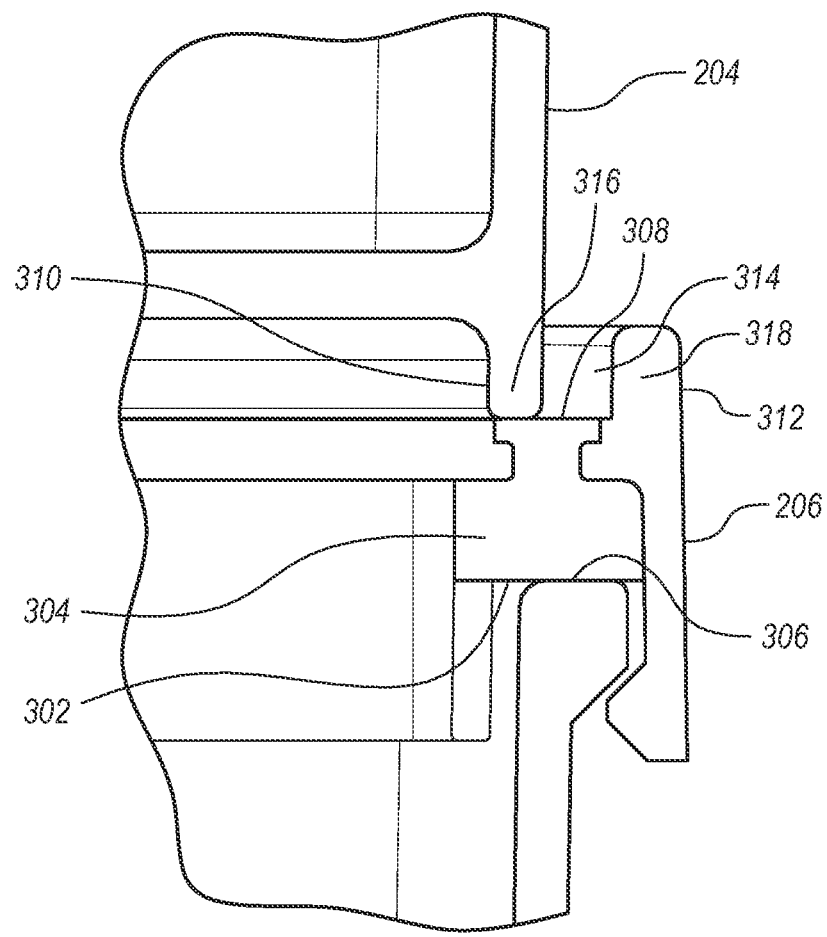

The relationship between the components is further illustrated in FIG. 3e, which is an enlarged, sectional view of the bottom portion of the upper canister 204 and the lower lid 206. As shown, in some exemplary embodiments, the upper surface 308 of the gasket 304 extends across a majority of the opening formed between the downward-projecting flange 310 and the rim 312. As illustrated in FIG. 3e, in this exemplary embodiment, the space 314 between the downward-projecting flange 310 of the upper canister 204 and the rim 312 of the lower canister 202 is about the same as the thickness 316 of the downward-projecting flange 310 and/or the thickness 318 of the rim 312 along a short dimension (FIG. 3B) and/or a long dimension (FIG. 3D). In some exemplary embodiments, the space 314 is about the same thickness as or thinner than the thickness 316 of the downward-projecting flange 310 and/or about the same thickness as or thinner than the thickness 318 of the rim 312 along a short dimension (FIG. 3B) and/or a long dimension (FIG. 3D), respectively, while still allowing the upper canister 204 to be freely removed from the lower canister 202 (the lower lid 206 does not grip the bottom of the upper canister 204 and/or is not dimensioned to create a tight fit between the lower lid 206 and the bottom of the upper canister 204).

Figure 4A:
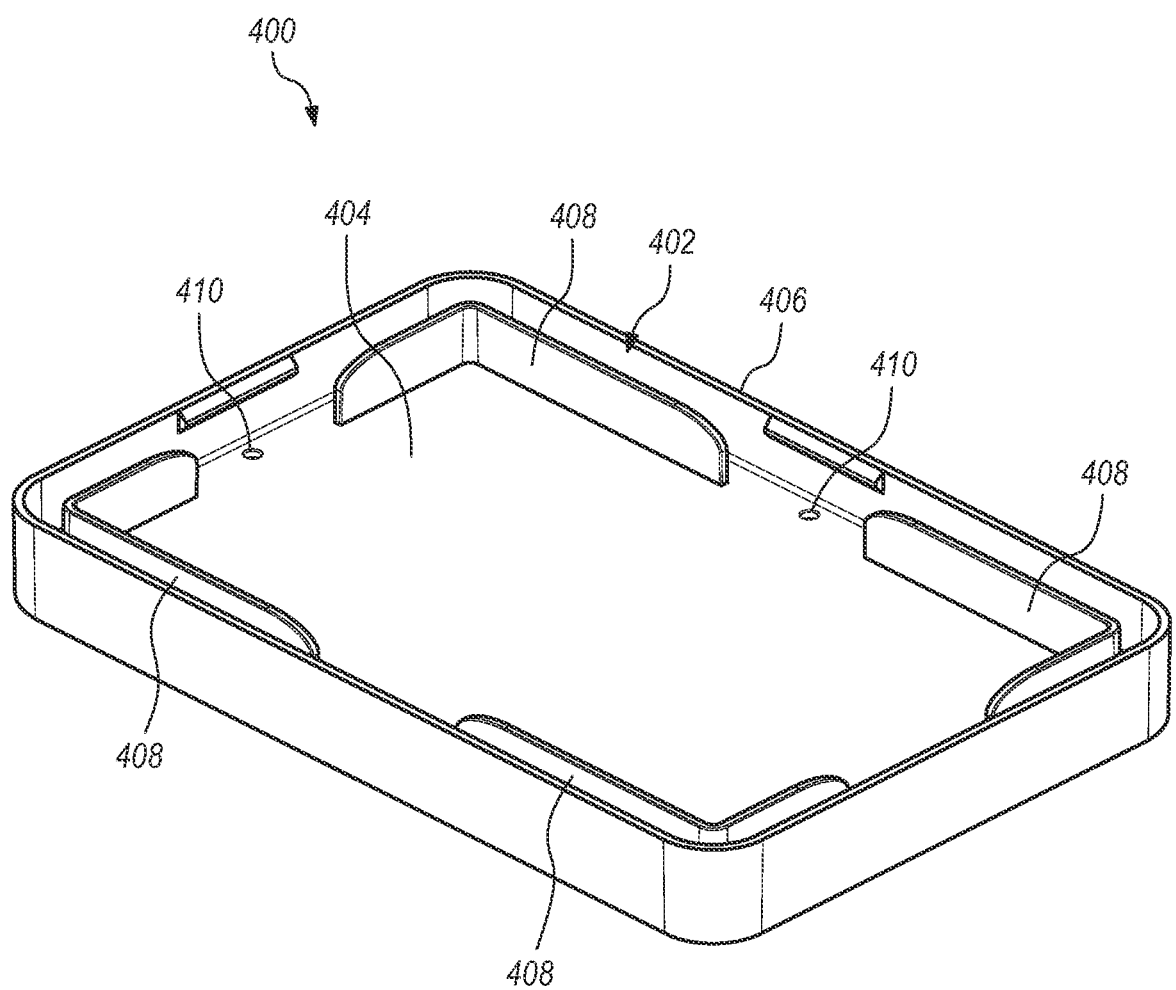
FIGS. 4a-4b show bottom and top perspective views of a canister lid according to an exemplary embodiment illustrated without a gasket for clarity.
Figure 4B:
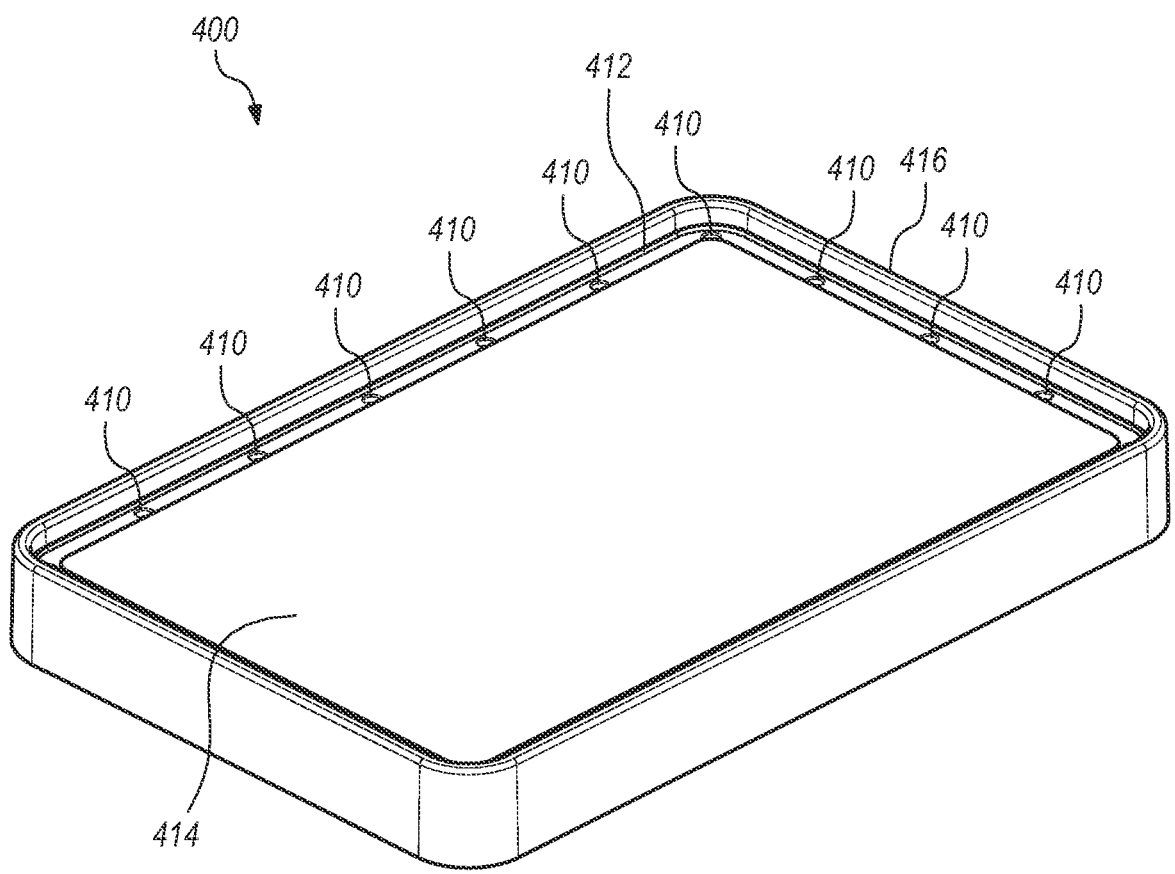

Referring to FIGS. 4a and 4b, an exemplary embodiment of a lid 400 is shown without a gasket. Referring to FIG. 4a, in some exemplary embodiments, a partial channel 402 is formed on the lower surface 404 of the lid 400. In such embodiments, the channel 402 is defined by an outer wall 406 and a plurality of partial inner walls 408. In exemplary embodiments, a gasket is overmolded into the channel 402. In some exemplary embodiments, the outer wall 406 is configured to help a user locate the lid 400 onto a canister when installing the lid 400 onto a canister. In some exemplary embodiments, the partial inner walls 408 are configured to define the position of a gasket adjacent to the outer edge of the lid 400. In other exemplary embodiments, the inner wall 408 may be continuous, thereby forming a ring. In alternate exemplary embodiments (nor shown), there are no partial inner walls 408 and the "channel" for the underside gasket is more of a continuous corner around the inside perimeter of the lid (a mold wall forms the boundary that partial inner walls 408 would otherwise form during the molding process).

Referring back to FIGS. 4a and 4b, in some exemplary embodiments, a plurality of openings 410 are formed in the lid 400. In such embodiments, the openings 410 are configured to permit gasket material to flow between an upper portion and a lower portion of the lid 400 during the gasket over-molding process. Referring to FIG. 4b, in some exemplary embodiments, a shallow channel 412 is formed in the top surface 414 of the lid 400 adjacent to a lip 416 formed at the perimeter of the lid 400. In such embodiments, the channel 412 is configured to define the position and desired location of the upper portion of the gasket on the lid 400.

Figure 5:
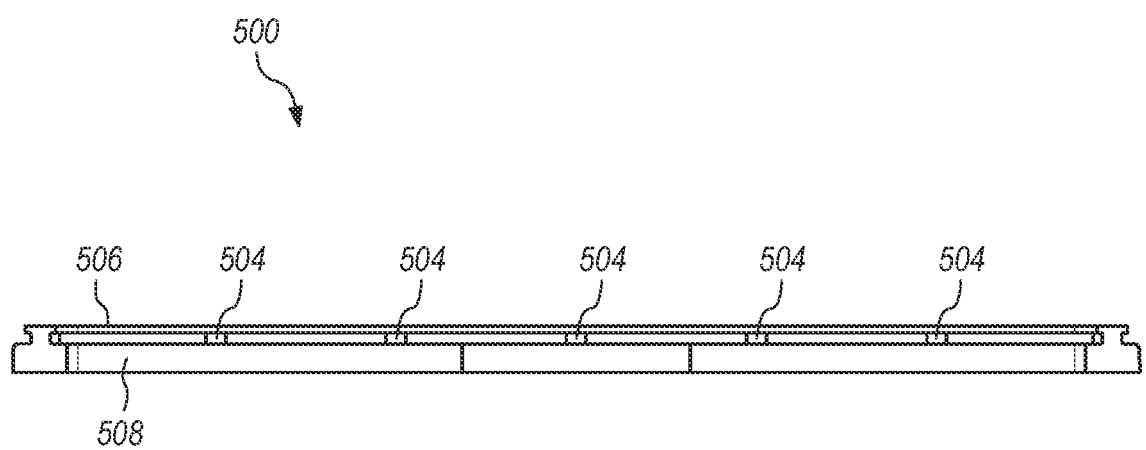
FIG. 5 illustrates a cross-sectional view of a gasket and a lid according to an exemplary embodiment.
Figure 6A:
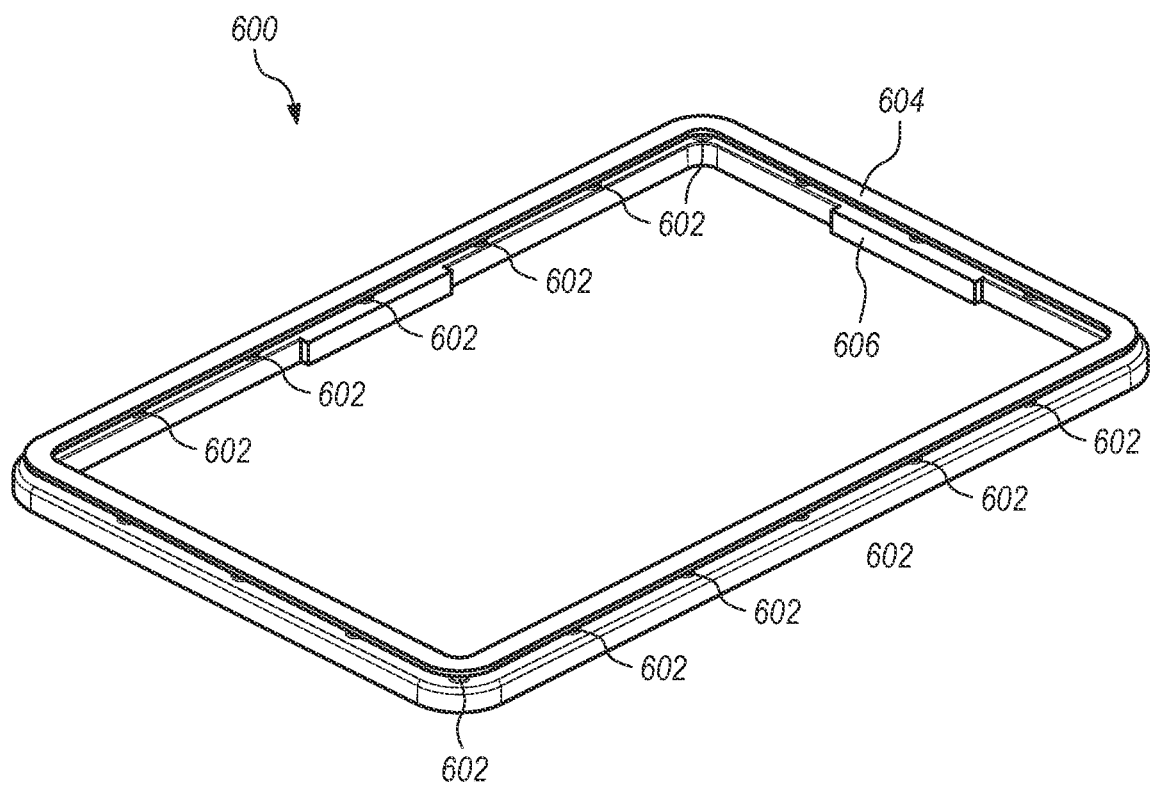
FIGS. 6a-6b show top and bottom perspective views of a gasket according to an exemplary embodiment.
Figure 6B:
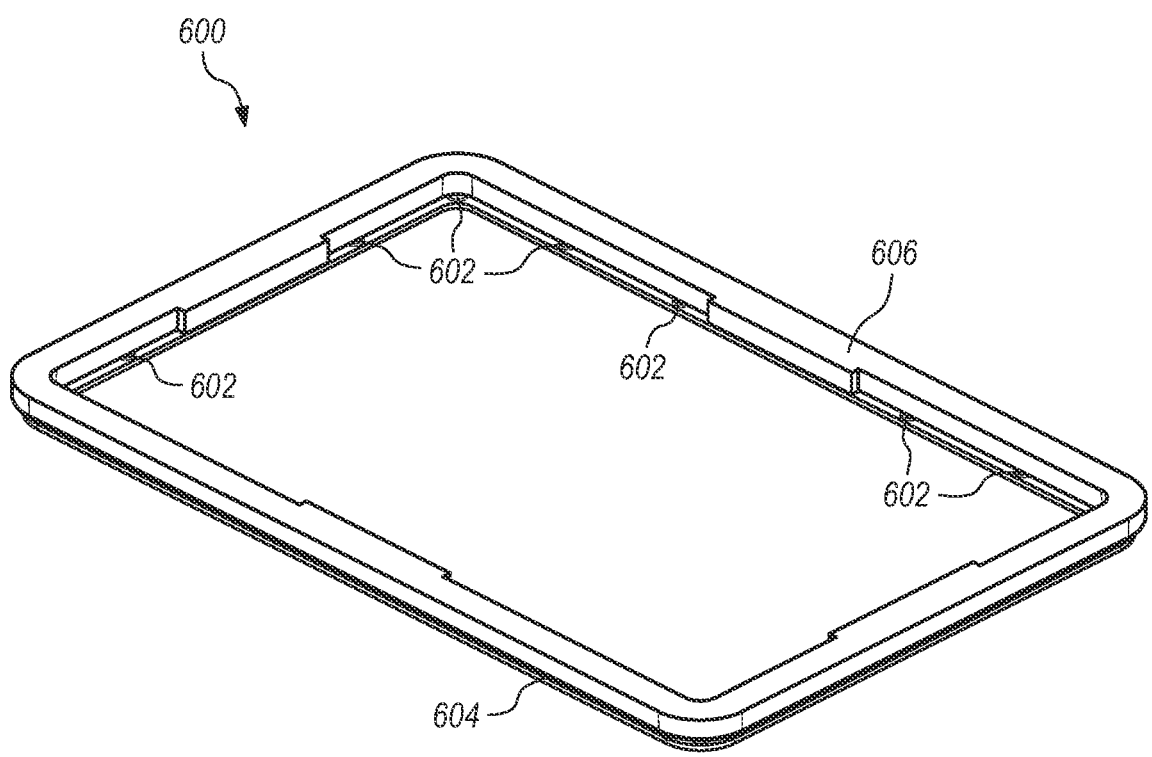

Referring to FIG. 5, a side view of an exemplary gasket 500 is shown. In some exemplary embodiments, exemplary gasket 500 includes gasket portions 504 that are formed from a thermoplastic material that has flowed through the openings 410 formed in the lid 400 during the overmolding process, e.g., solidified during the cooling cycle of the overmolding process. In such exemplary embodiments, the gasket portions 504 are configured to secure the upper 506 and lower portion 508 of the gasket to the lid 400. Referring to FIGS. 6a-6b, upper (FIG. 6a) and lower (FIG. 6b) perspective views of an exemplary gasket 600 (with the lid removed from the drawing for clarity) are shown. In some exemplary embodiments, a plurality of material bridges 602 are formed between upper 604 and lower 606 portions of the gasket 600, respectively, based on a thermoplastic material that has flowed through the openings 410 formed in the lid, e.g., solidified during the cooling cycle of the overmolding process.

Figure 7A:
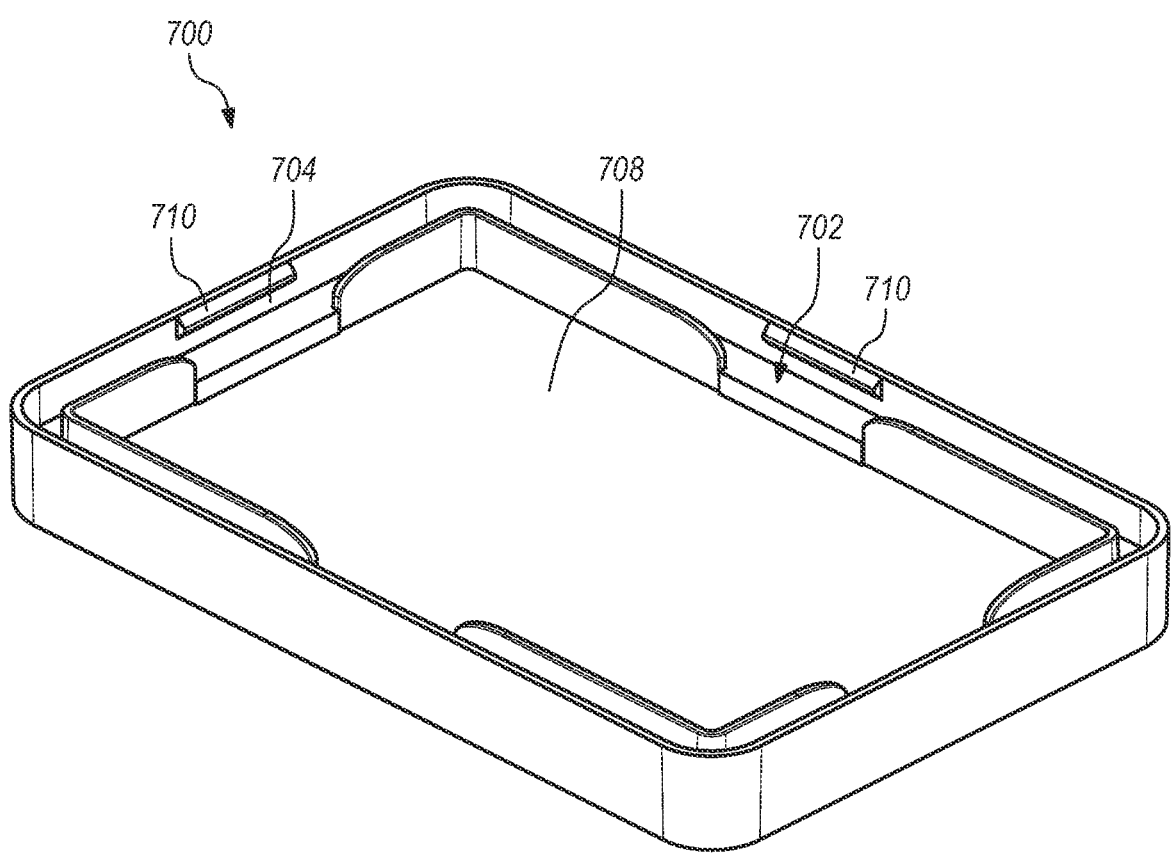
FIGS. 7a-7b show bottom and top perspective views of the canister lid of FIGS. 4a-4b illustrated with a gasket according to an exemplary embodiment.
Figure 7B:
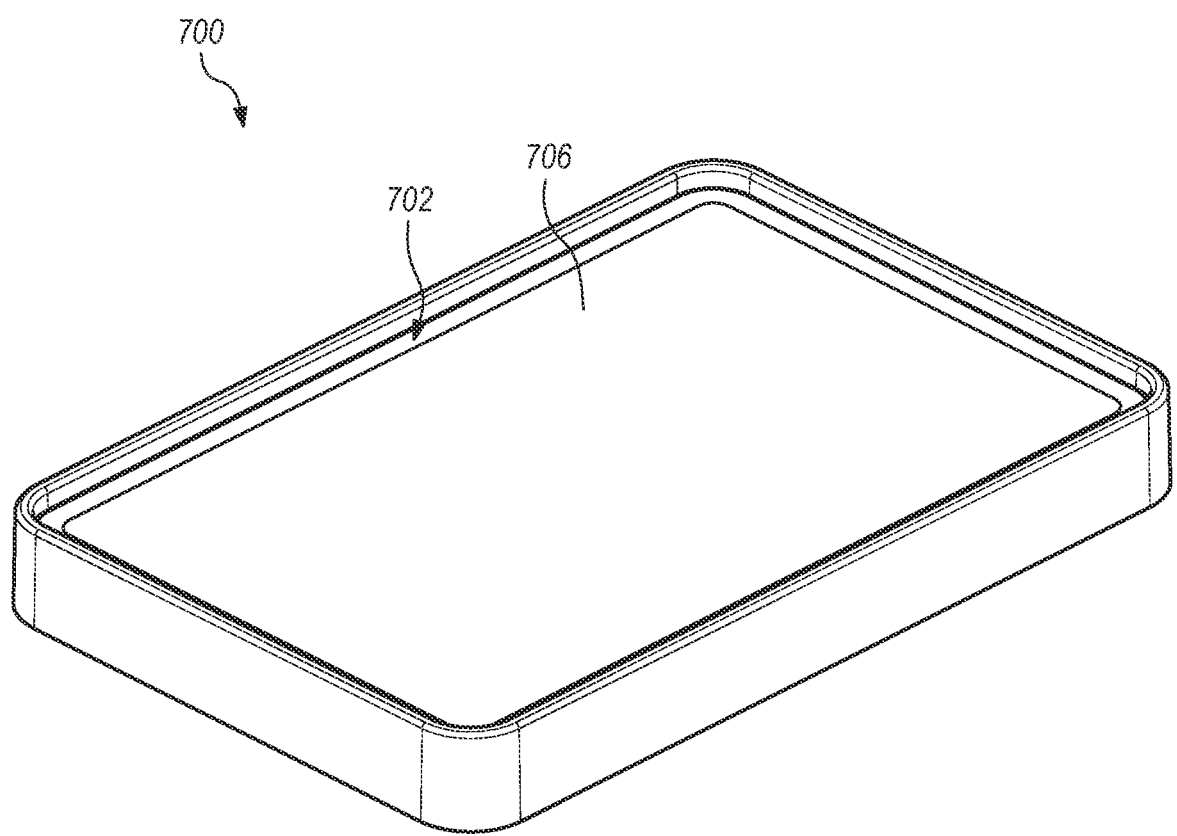

FIGS. 7a-7b illustrate the exemplary lid 400 of FIGS. 4a-4b with the addition of a gasket, e.g., gasket 500 or 600 of FIGS. 5 and 6a-6b. As illustrated, in some exemplary embodiments, the complete lid 700 includes a gasket 702 that has been formed from a thermoplastic material that has flowed through the lid to form a lower sealing surface 704. In some exemplary embodiments, the lower sealing surface 704 is configured to compress against the upper rim of a canister to form a seal that is sufficient to protect the contents of the canister from the external environment. As was discussed earlier herein, the gasket 702 is exposed on both the upper 706 (FIG. 7b) and lower 708 (FIG. 7A) lid surface. As illustrated in FIGS. 3a-3d, the exposed gasket 702 provides a non-slip, stabilizing interface between the lid/gasket assembly and the base of another canister that may be stacked on the lid of a lower canister. Referring to FIG. 7a, in some exemplary embodiments, snap-fit latches 710 are formed on the lid and are configured to be secured to an upper lip flange of a canister, respectively, for removably coupling the lid onto the canister.

Figure 8:
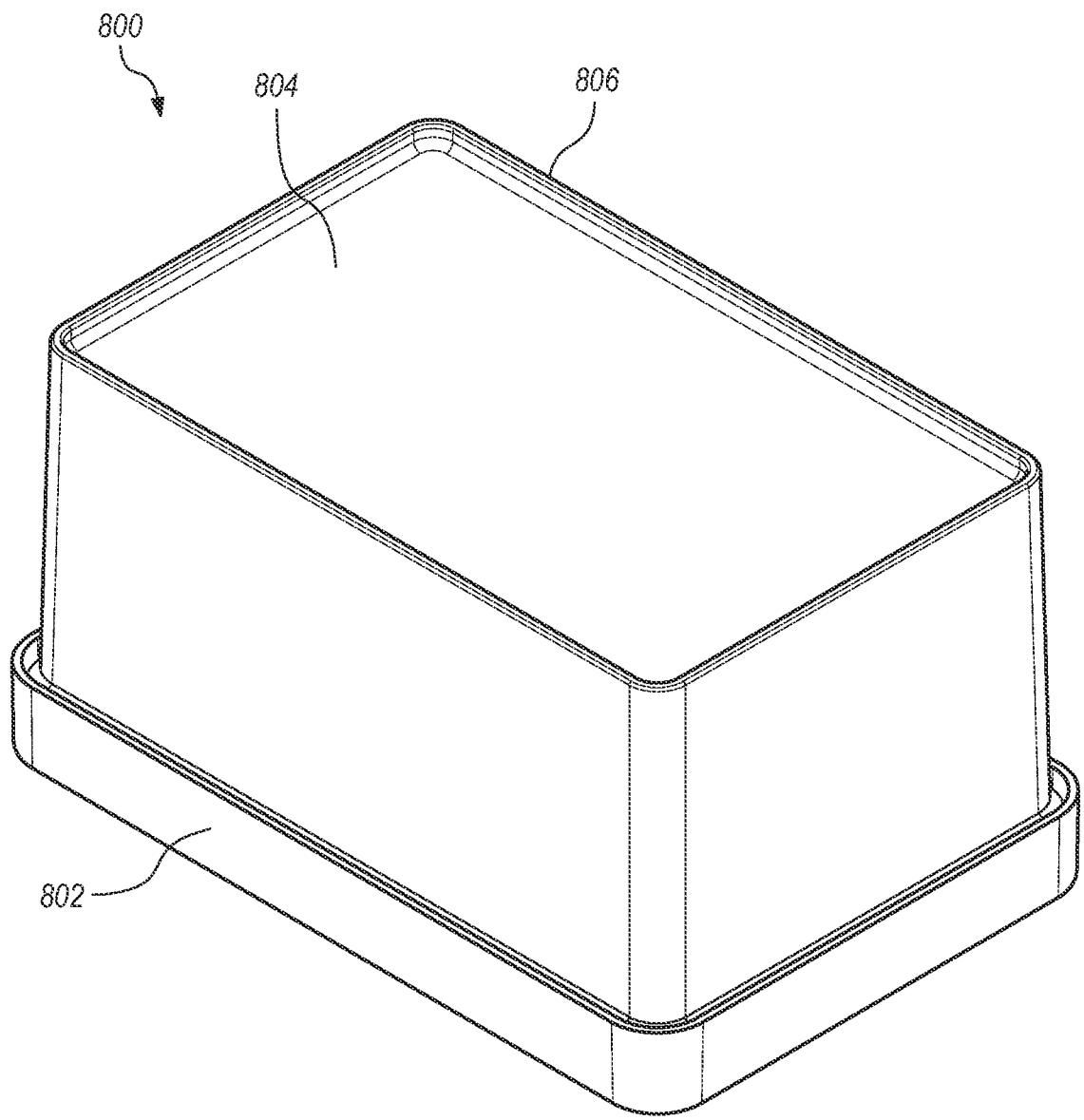
FIG. 8 illustrates a bottom perspective view of a canister according to an exemplary embodiment.

Referring to FIG. 8, an exemplary canister 800 that is configured to be used with the lid of FIGS. 7a-7b is shown. In exemplary embodiments, an upper portion 802 of the canister 800 is configured to cooperate with a lid (not shown) for sealing the canister 800. In some exemplary embodiments, a base 804 of the canister 800 is configured to contact a portion of a gasket that is exposed on the upper lid surface (not shown). In the illustrated exemplary embodiment, a downward projecting flange 806 is formed on the base 804 of the canister and is configured to contact the gasket that is exposed on the upper lid surface (e.g., 702 in FIG. 7b) when the canister is placed on the lid.

Figure 9:
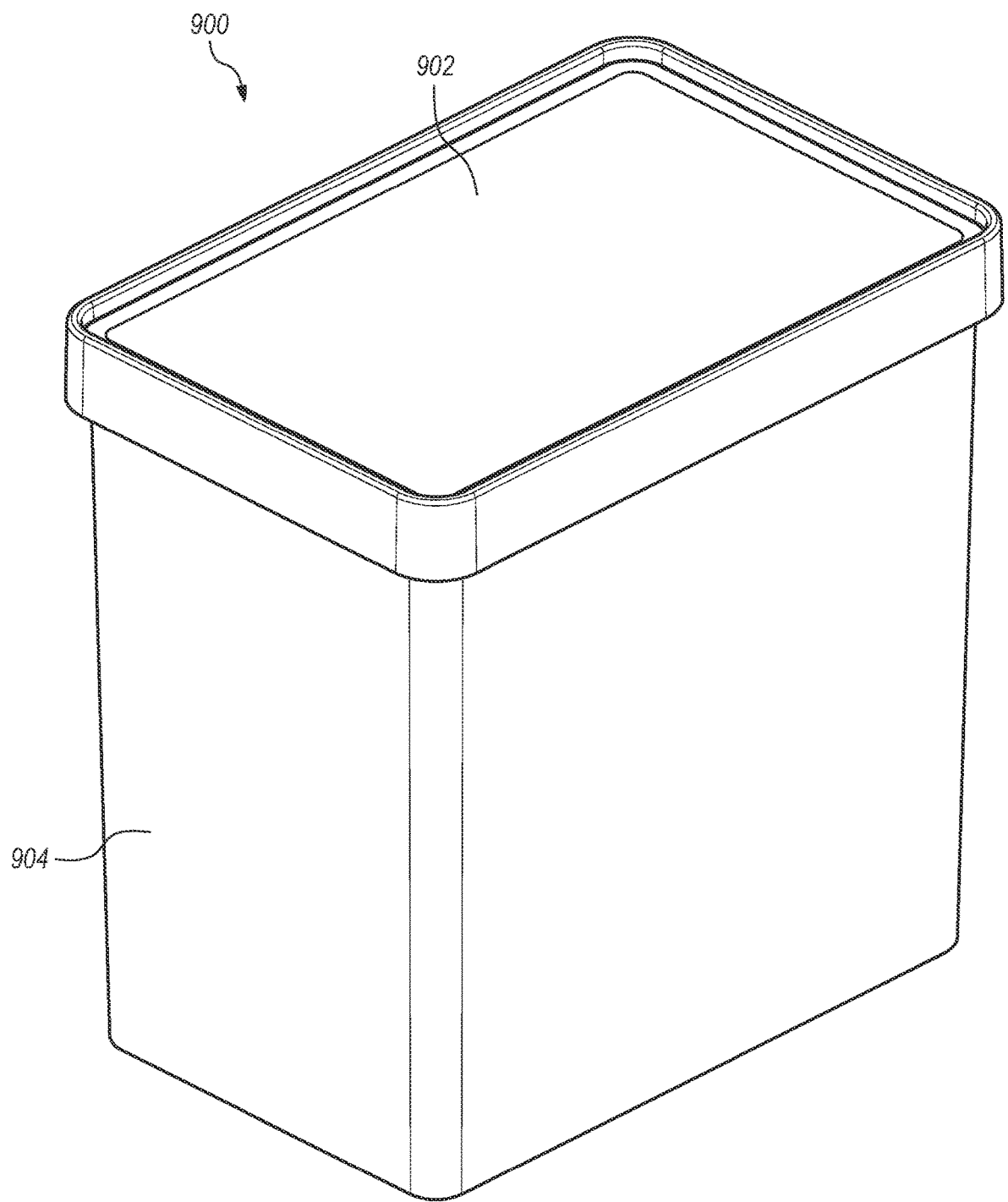
FIG. 9 illustrates a canister having a lid according to an exemplary embodiment.
Figure 10:
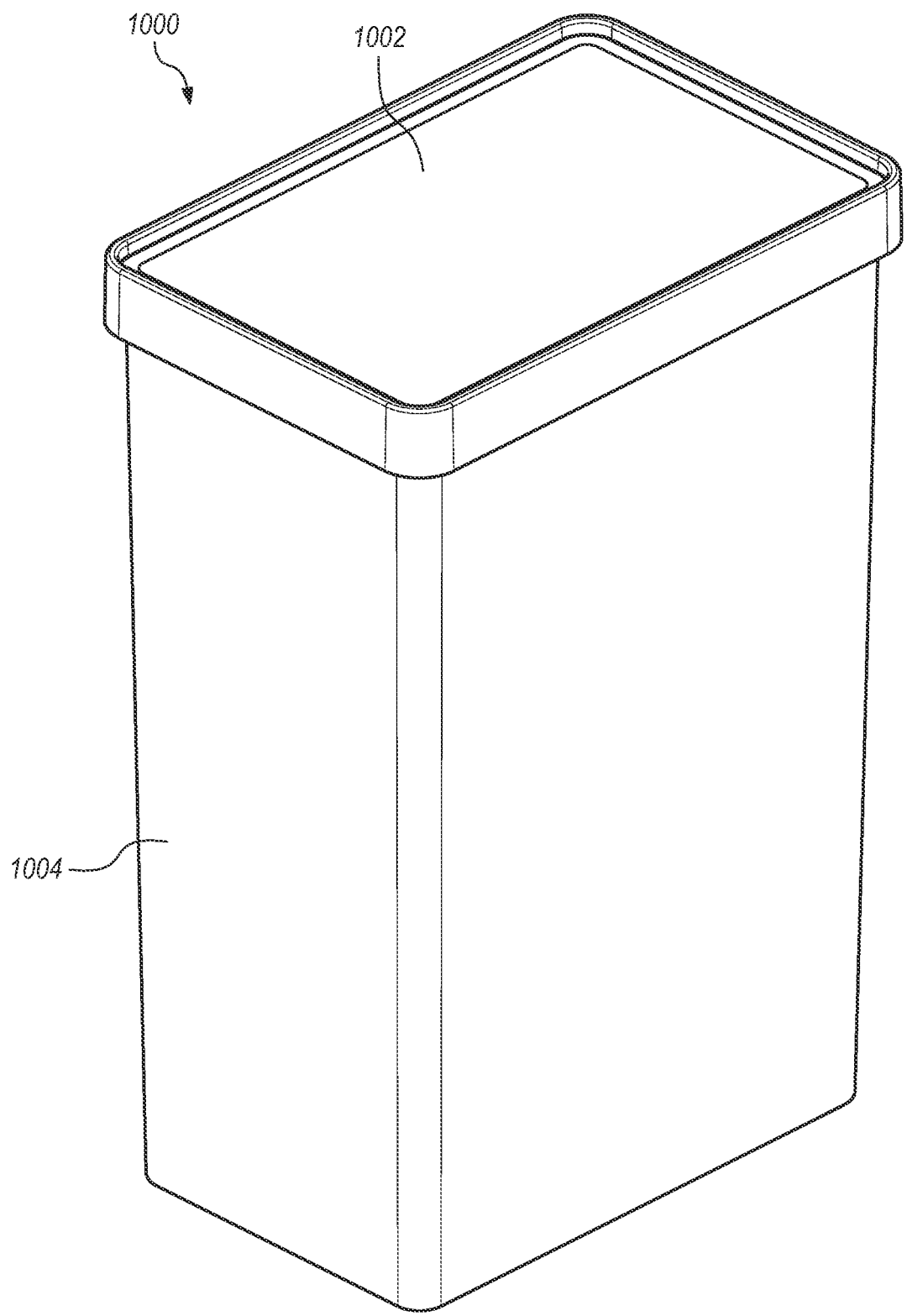
FIG. 10 illustrates a canister having a lid according to another exemplary embodiment.

FIGS. 9 and 10 illustrate exemplary embodiments of canisters and lids 902 and 1002. As illustrated by the exemplary embodiments, exemplary lids 902 and 1002 may be applied to canisters 904 and 1004 that vary in dimension without departing from claimed concept. In exemplary embodiments, the canisters of FIGS. 1-3e and 8-10 all use the same sized lid and taper down to the same footprint down at the bottom. Consequently, FIG. 3e would be the same if any of the canisters of FIGS. 1-3e and 8-10 were switched on any of the other canisters of FIGS. 1-3e and 8-10 with a lid on (the upper sidewall angle in FIG. 3e would merely be slightly different).

Canisters such as those illustrated and described herein may be used to store any number of different items. In certain circumstances, it may be desirable to have an opening that is smaller than the opening formed at a top portion of the canister. Such an opening may be desirable when a canister is used to store dry, perishable goods (e.g., dry breakfast cereal), and particularly, in such instances where a user may wish to pour perishable goods from the canister without removing the entire canister lid. In such circumstances, an opening may be formed in a lid for use on the canister. In exemplary embodiments, an opening formed in the lid may be provided with a cover that is configured to be closed for protecting the contents of the canister from the external environment, e.g., when a user places the canister in a cabinet or other storage area.

Referring to FIGS. 11A-14, another exemplary canister 1100 according to the present application is shown. Exemplary canister 1100 includes a canister lid 1102 having an opening 1104 and a hinged lid 1106 that is pivotally attached to the canister lid 1102. In exemplary embodiments, the opening 1104 and the hinged lid 1106 are configured to enable a user to easily pour contents from the canister 1100 without removing the entire canister lid 1102.

Figure 11A:
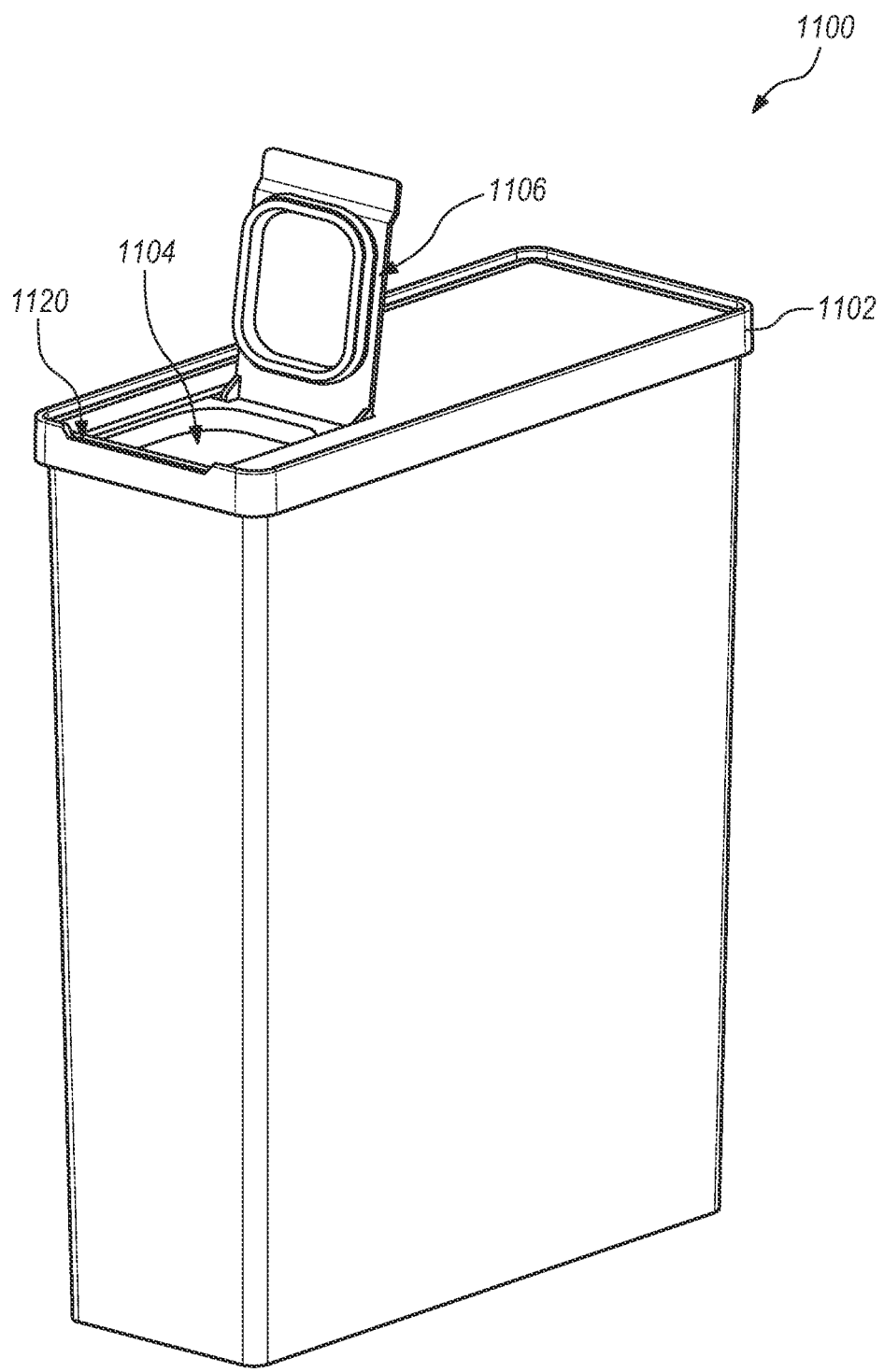
FIG. 11A illustrates a canister having a lid where the lid has a pouring spout and flip-up cover according to another exemplary embodiment.
Figure 11B:
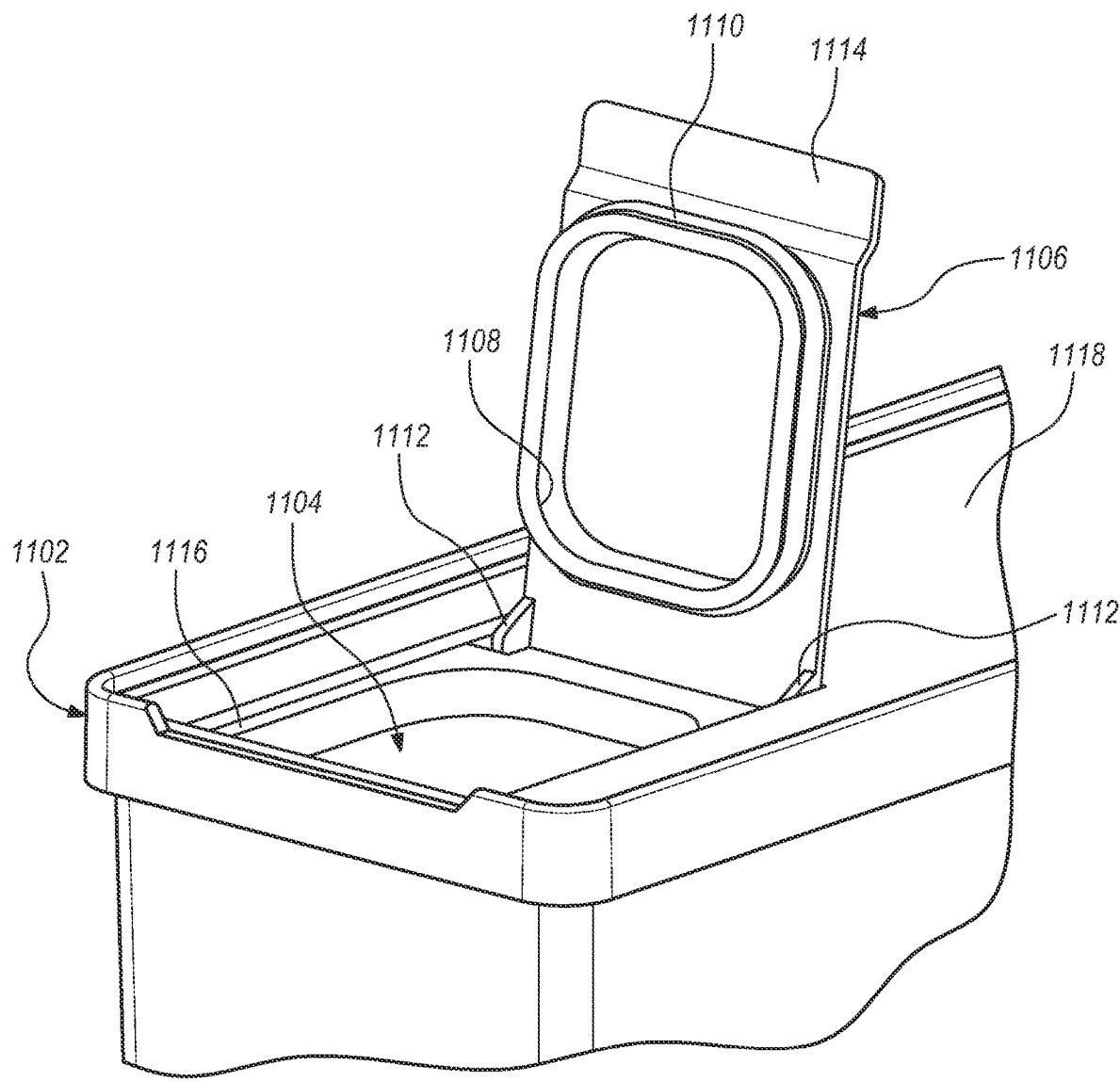
FIG. 11B illustrates an expanded view of a portion of the canister and the lid according to FIG. 11A.
Figure 12:
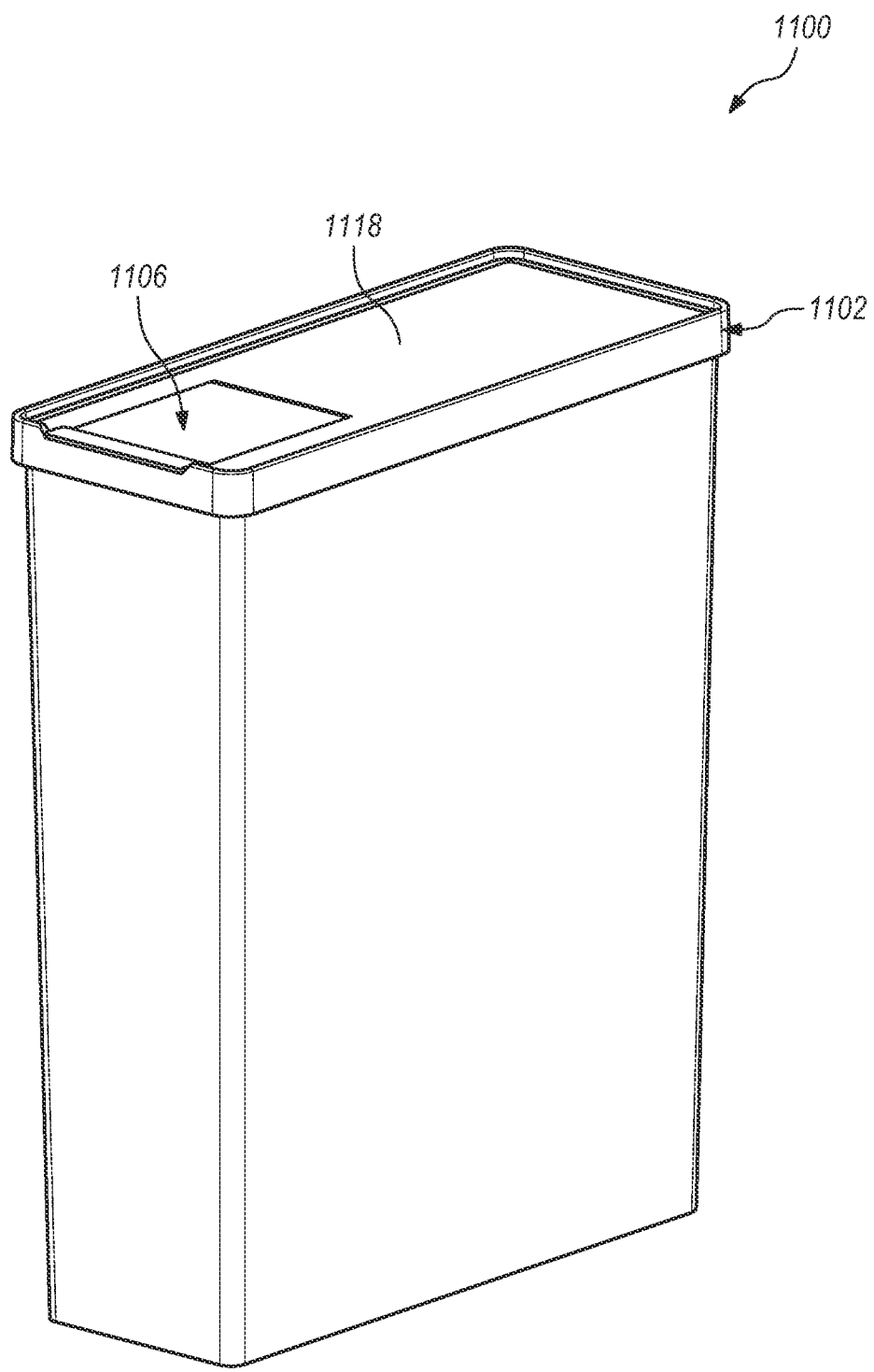
FIG. 12 illustrates the canister and the lid of FIG. 11A with the flip-up cover in a closed position.

As shown in FIG. 11A, in some exemplary embodiments, the hinged lid 1106 is configured to seal the opening 1104 when the hinged lid 1106 is in a closed position, e.g., coplanar with the canister lid. Referring to FIG. 11B (an enlarged view of a portion of the canister 1100 of FIG. 11A), in some exemplary embodiments, the hinged lid 1106 comprises a raised portion 1108 that is provided with a gasket material 1110 that is located at an outer circumference of the raised portion 1108. In exemplary embodiments, the hinged lid 1106 comprises a hinge structure 1112 that is mechanically coupled to the canister lid 1102 for enabling the hinged lid 1106 to open and close. Exemplary embodiments of the hinged lid 1106 may also comprise a lifting flange 1114 that is configured to enable a user to grasp the hinged lid 1106 when opening and closing hinged lid 1106.

Referring to FIG. 11B, in exemplary embodiments, a recess 1116 is formed in the canister lid 1102. In some exemplary embodiments, the recess 1116 is configured to receive the hinged lid 1106 such that an upper surface of the hinged lid 1106 is substantially flush with the upper surface 1118 of the canister lid when the hinged lid 1106 is in a closed position, such as that shown in FIG. 12.

Figure 13A:
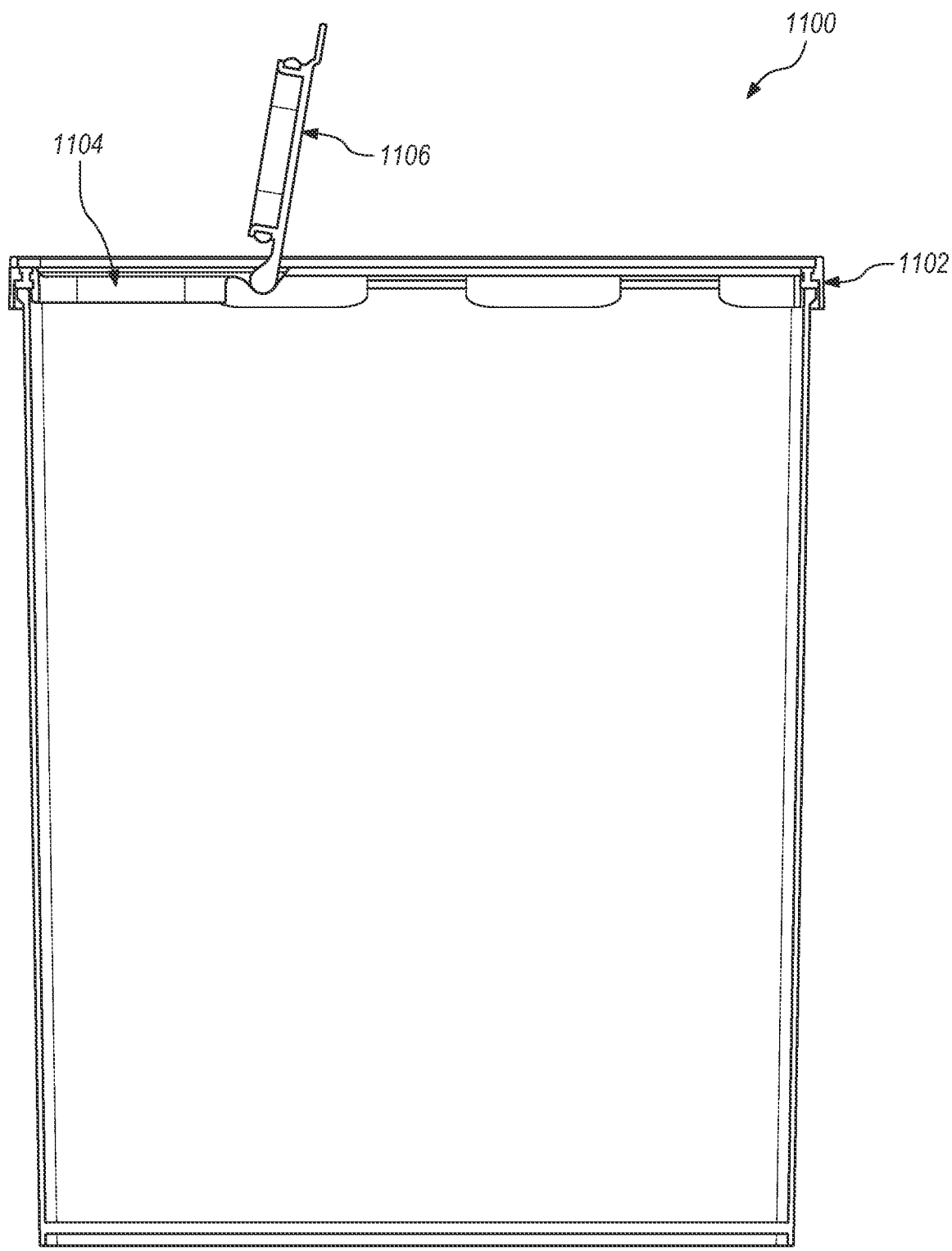
FIG. 13A illustrates a sectional side view of the canister and the lid of FIG. 11A.
Figure 13B:
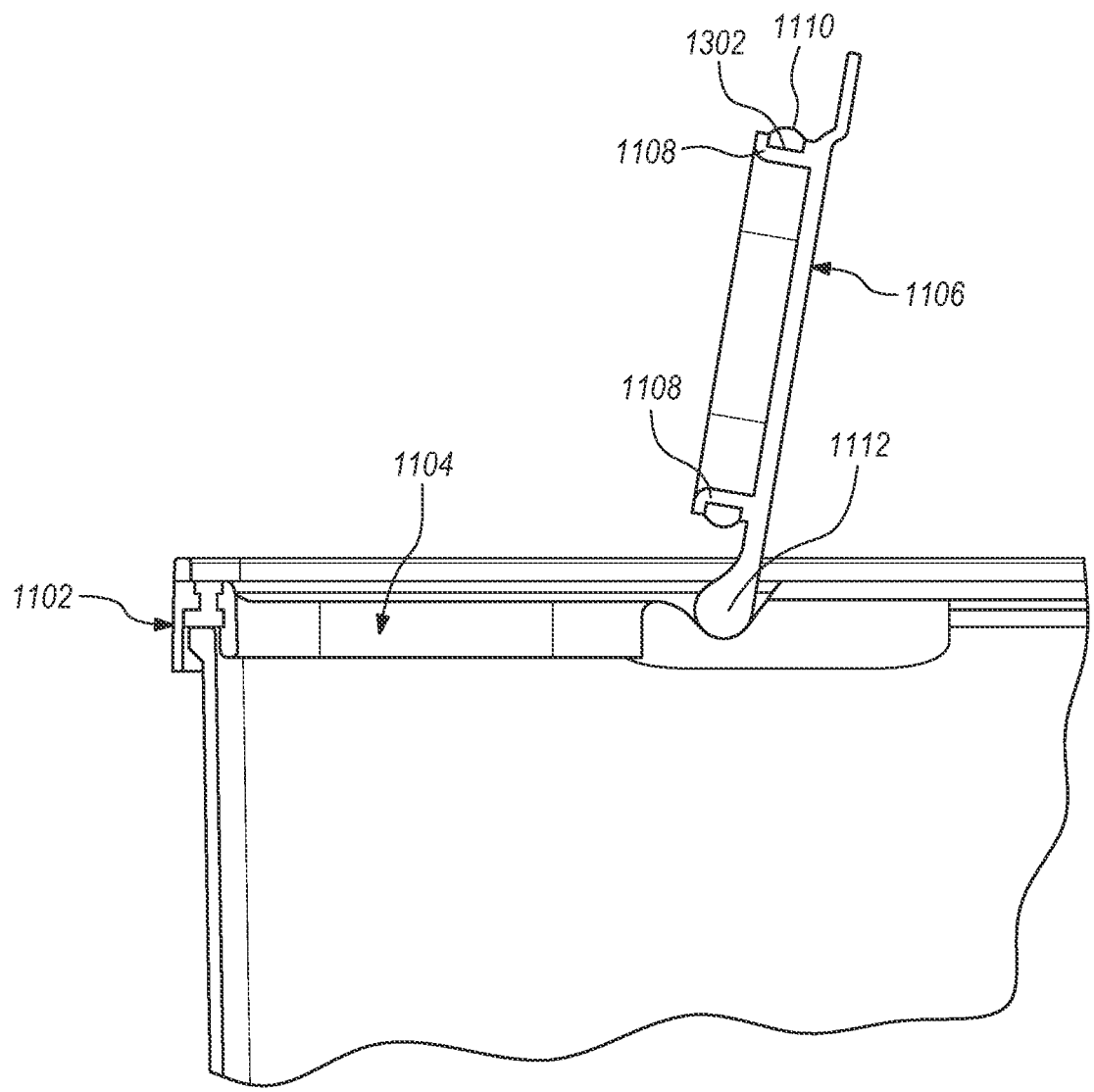
FIG. 13B illustrates an expanded view of a portion of the canister and the lid according to FIG. 13A.

Referring to FIGS. 13A and 13B, sectional, side views of the canister 1100 of FIG. 11A are shown. A cross section of the gasket material 1110 provided on the raised portion 1108 of the hinged lid 1106 is visible in the enlarged view of FIG. 13B. In some exemplary embodiments, the raised portion 1108 comprises a recess 1302 that is configured to receive the gasket material 1110 and keep the gasket material 1110 in place when the hinged lid 1106 is opened and closed. Still referring to FIG. 13B, in some exemplary embodiments, the hinge structure 1112 is mechanically coupled to the canister lid 1102 for securing the hinged lid 1106 to the canister lid 1102. In exemplary embodiments, the hinge structure 1112 causes the hinged lid 1106 to align with the opening 1104 formed in the canister lid 1102.

Figure 14:
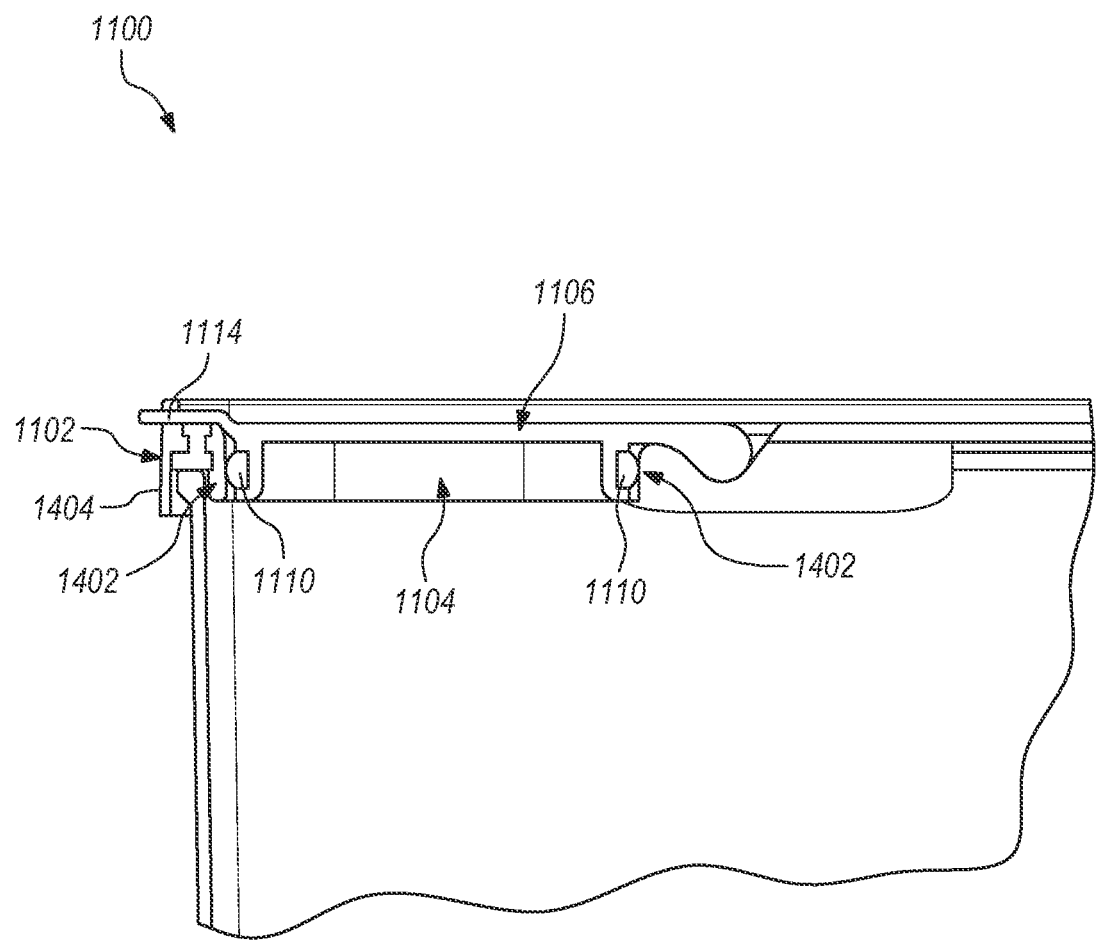
FIG. 14 illustrates an expanded view of the portion of the canister and the lid from FIG. 13B with the flip up cover in a closed position.

FIG. 14 illustrates an enlarged view of a portion of the canister lid 1102 from FIG. 13B in which the hinged lid 1106 is in the closed position. That is, the hinged lid 1106 is positioned such that it seals the opening 1104 formed in the canister lid 1102 to protect the contents of the canister 1100 from the external environment. As illustrated, in some exemplary embodiments, the gasket material 1110 of the hinged lid 1106 is configured to contact the side portion 1402 of the opening 1104 to form a seal between the hinged lid 1106 and the opening 1104 formed in the canister lid 1102. In some exemplary embodiments, the lifting flange 1114 is configured to be seated into an opening or recess (e.g., 1120 in FIG. 11) formed in a section of the canister lid 1102. In some exemplary embodiments, the recess is configured to permit the lifting flange 1114 to extend beyond the exterior perimeter 1404 of the canister lid 1102 in order to allow a user to more easily grasp the lifting flange 1114 when opening and closing the canister lid 1102.

Figure 15:
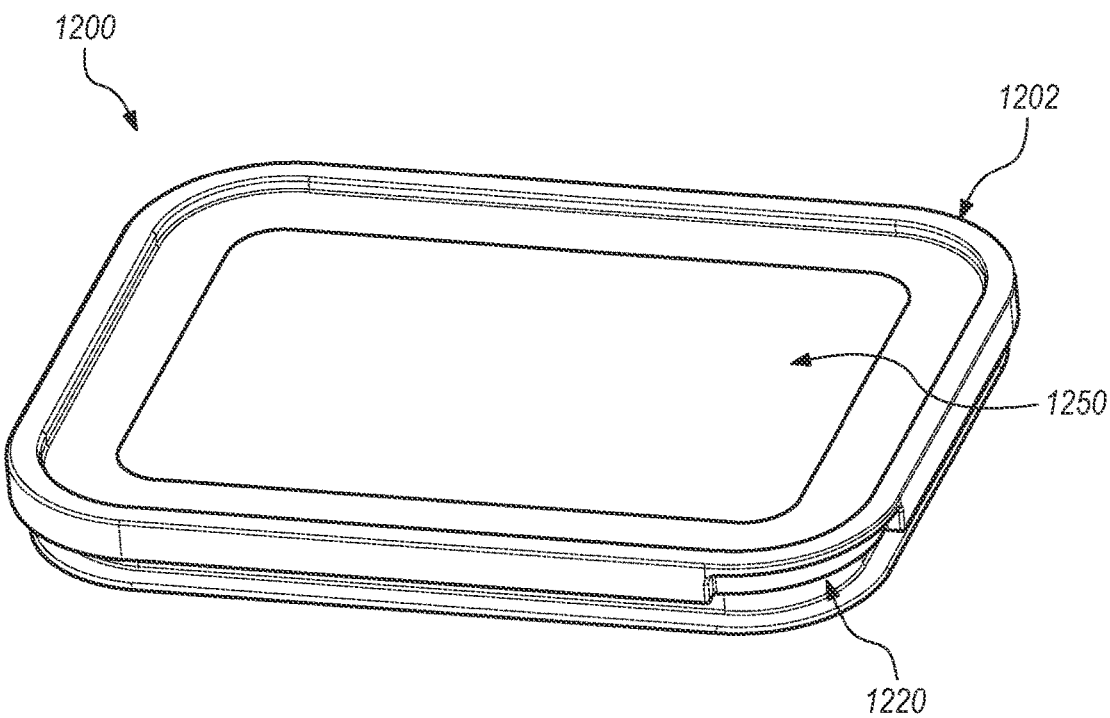
FIG. 15 illustrates a canister lid according to another exemplary embodiment.

Referring now to FIG. 15, an alternative embodiment of a canister lid 1200 is shown. In the illustrated embodiment, exemplary canister lid 1200 comprises a lid frame 1202 that is molded over a body 1250. In exemplary embodiments, the canister lid 1200 is configured to be used with a canister 1300, such as that shown in the illustrated embodiments of FIGS. 16-17. In some exemplary embodiments, the canister 1300 and/or the lid 1200 are formed from PET, PETG, or a styrenic material (e.g., Zylar®). In some exemplary embodiments, the lid 1200 and the canister 1300 are formed from materials that are free of Bisphenol A (BPA). In further exemplary embodiments, the lid 1200 and the canister 1300 are formed of materials that render the lid 1200 and the canister 1300 suitable for use in a dishwasher, freezer, or microwave appliance. In exemplary embodiments, the lid frame 1202 is formed from a TPE plastic having a coefficient of friction that is greater than the materials that are used to form the canister 1300 and the lid body 1250. In some exemplary embodiments, the TPE material is selected to give the lid frame 1202 a soft touch feel and more of a rubbery density than the other materials (e.g., a TPE that is a little harder than silicone) to provide a good non-slip surface for a second canister on the top of the lid 1200.

Figure 17:
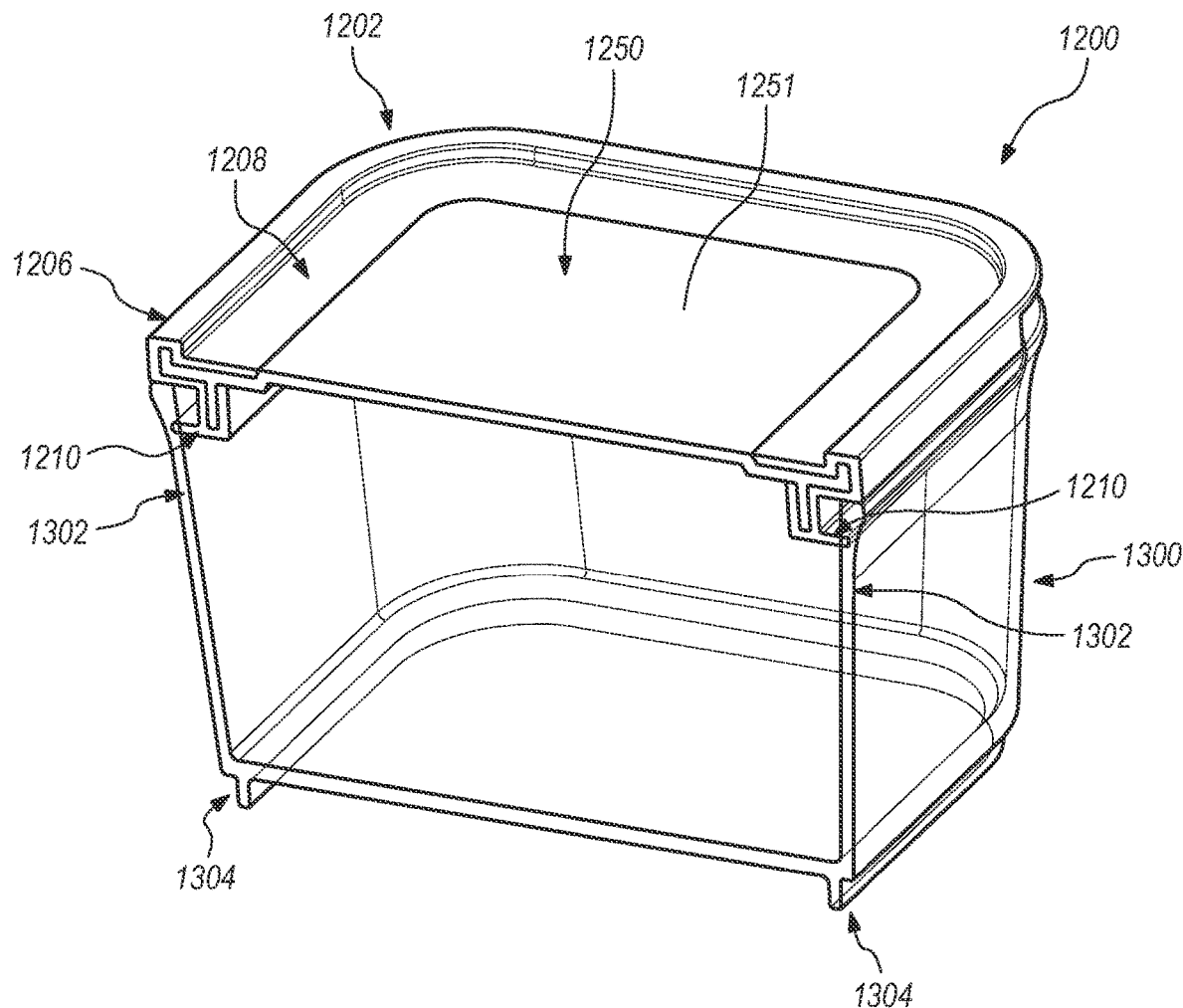
FIG. 17 illustrates a sectional view of the canister and canister lid according to FIG. 16 (with an opaque central lid portion).

Referring now to FIG. 17, a sectional view of an exemplary canister lid 1200 and canister 1300 is shown. In exemplary embodiments, the canister lid frame 1202 comprises an annular body having a cross section that defines a T-shaped channel (e.g., 1212 in FIG. 19) that is configured to house the body 1250. In exemplary embodiments, the body 1250 is molded prior to overmolding the canister lid frame 1202 onto the molded body 1250. In such exemplary embodiments, the canister lid frame 1202 is overmolded around the body 1250 by injecting molten, thermoplastic material (e.g., TPE) into a mold containing the body 1250 such that the lid frame 1202 is formed around the body 1250 after an appropriate cooling cycle.

In exemplary embodiments, the lid frame 1202 comprises an upper surface 1208 that is formed from a material (e.g., TPE plastic) having a coefficient of friction that is greater than the materials used to form the canister 1300. In some exemplary embodiments, the upper surface 1208 is configured to provide a non-slip surface for an annular lip (e.g., 1304 in FIG. 17) formed on the base of the canister, such as, for example, when an upper canister is placed on a lower canister for storage purposes (see, e.g., 1400 and 1500 in FIG. 23 and FIGS. 24-26). In this manner, the upper surface 1208 is particularly suitable for preventing an upper canister from sliding off a lower canister. In some exemplary embodiments, the body 1250 is formed from a clear polymer (e.g., PET, PETG, or Zylar which is a styrenic) to provide a window (e.g., 1251 in FIG. 17) from the top to view the contents of the canister from above (in FIG. 16, the exposed, upper surface is shown as being transparent). In some exemplary embodiments, in the alternative, the body 1250 is formed from a TPE material having a coefficient of friction that is greater than the material used to form the canister 1300 so that an exposed, upper surface (e.g., 1251 in FIG. 17) of the body 1250 may also inhibit an upper canister from sliding off of the canister lid 1200.

Figure 19:
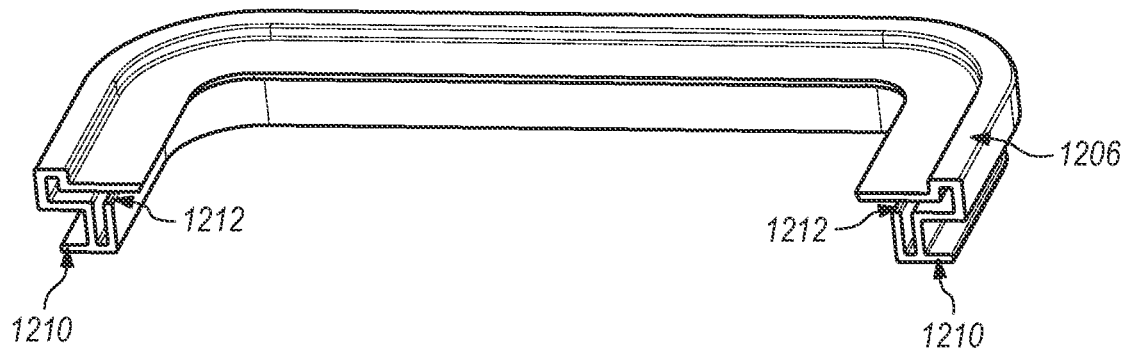
FIG. 19 illustrates a sectional view of the lid frame of FIG. 18.
Figure 21:
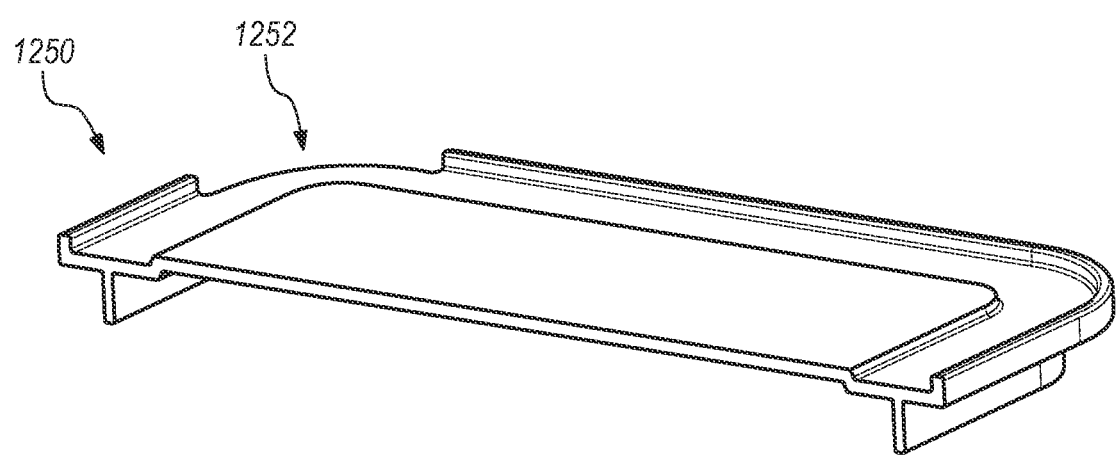
FIG. 21 illustrates a sectional view of the lid body of FIG. 20.
Figure 22:
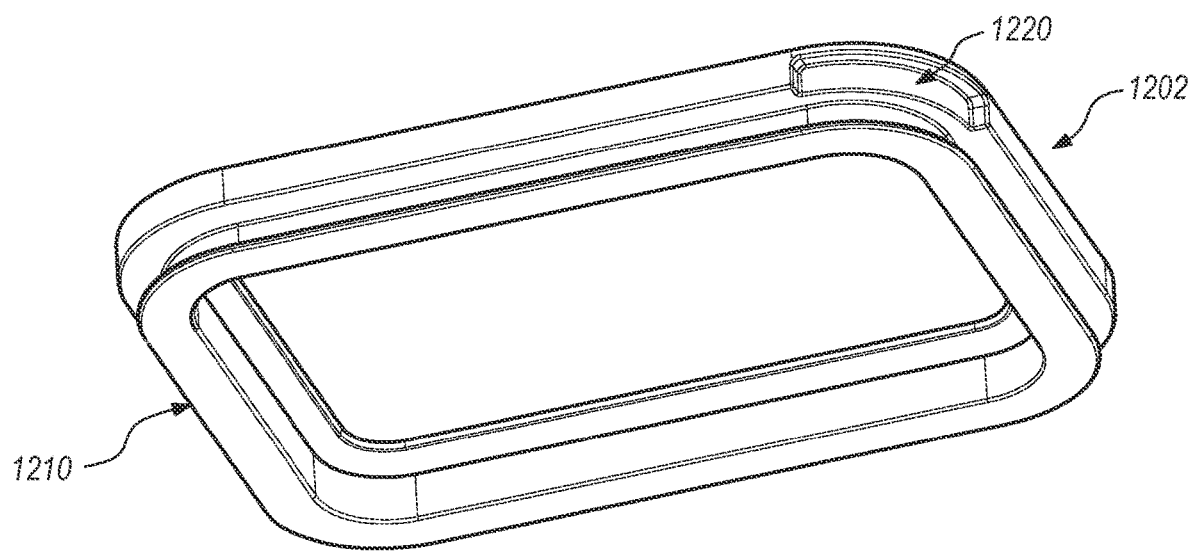
FIG. 22 is a front/right/bottom view of the lid frame of FIGS. 18-19.

Referring now to FIG. 17, in some exemplary embodiments, an annular rim 1206 is formed on the periphery of the lid 1200 for defining a recessed, accommodating area (including upper surface 1208) for an upper canister. In such exemplary embodiments, the annular rim 1206 is dimensionally sized and configured to prevent the annular lip 1304 formed on an upper canister from sliding off the upper surface 1208 of the lid 1200 when two or more canisters are placed in a stacked arrangement (e.g., 1400 and 1500 in FIG. 23). Preferably, and in some exemplary embodiments, the annular rim 1206 is sized and configured not to grip or tightly fit a second canister on top of the lid 1200, which facilitates easy stacking. As shown in FIGS. 17, 19, and 21, in exemplary embodiments, the rim 1206 is supported by an upward extending portion of the lid body 1250 over which the material forming the annular rim 1206 is overmolded.

In some exemplary embodiments, the lid frame 1202 comprises a cantilevered flange 1210. Cantilevered flange 1210 is sized and configured to flex and be compressed against an inside 1301 of side wall 1302 of the canister 1300 when the canister lid 1200 is placed onto the canister 1300, e.g., when downward pressure is exerted on an upper surface of the canister lid 1200 for attaching the canister lid 1200 to the canister 1300. In some exemplary embodiments, the body 1250 and the cantilevered flange 1210 cooperate to provide an air-tight seal when the canister lid 1200 is placed onto the canister 1300, e.g., when pressure is exerted on an upper surface of the lid frame 1202, the body 1250, or both.

Figure 18:
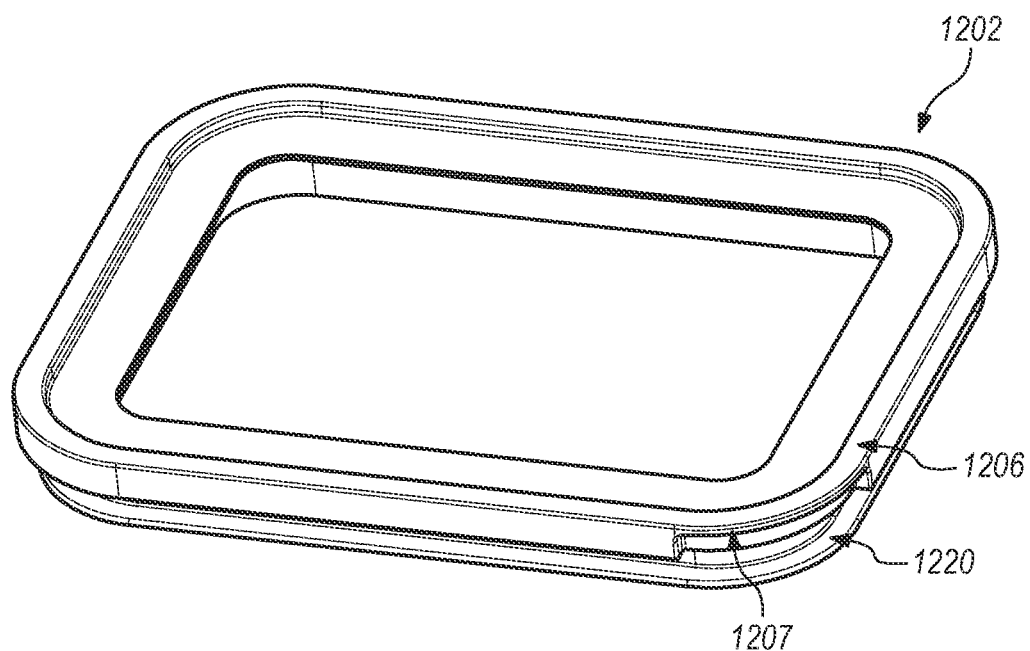
FIG. 18 illustrates an exemplary lid frame according to an exemplary embodiment.

Referring now to FIG. 18, an exemplary lid frame 1202 is shown. In exemplary embodiments, the lid 1200 is removed by simply lifting the lid 1200 from the canister 1300 using friction of the material selected for the frame 1202. In some exemplary embodiments, one or more openings or gaps are formed in the lid frame 1202 for defining one or more opening portions 1220 to facilitate a user opening the canister (by removing the lid). In such exemplary embodiments, the opening portions 1220 are sized and arranged to enable a user to insert one or more fingers into each opening portion 1220 such that a user lifts the lid 1200 upwards via a ledge 1207 that is formed on the lid frame 1202 to remove the lid 1200 from the canister 1330. In exemplary embodiments, the lid frame 1202 includes one or more opening portions 1220 in one or more corners of the lid frame 1202.

Figure 20:
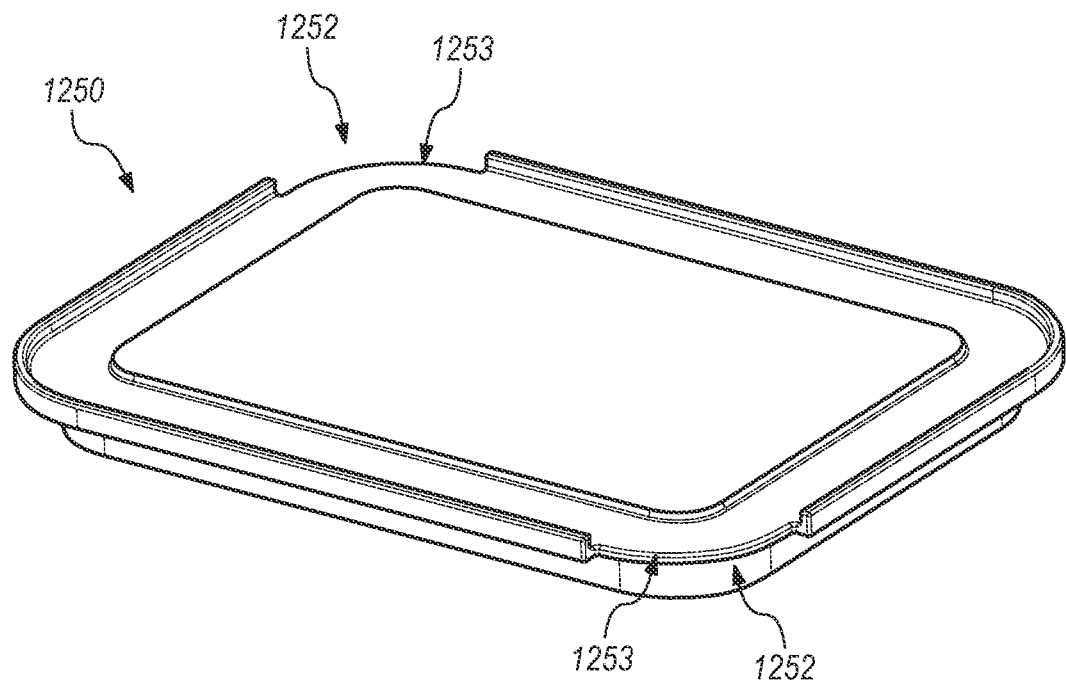
FIG. 20 illustrates an exemplary lid body according to another exemplary embodiment.

Referring now to FIGS. 20-21, an exemplary lid body 1250 is shown. In exemplary embodiments, at least one or more notches 1252 are formed in the body 1250 and are configured to cooperate with the gaps that define the opening portions 1220 of the canister lid 1200. In some exemplary embodiments, the body 1250 comprises one or more peripheral edges 1253 that are configured to be compressed against one or more interior walls (not shown) of the lid frame 1202 for maintaining an airtight seal.

Figure 16:
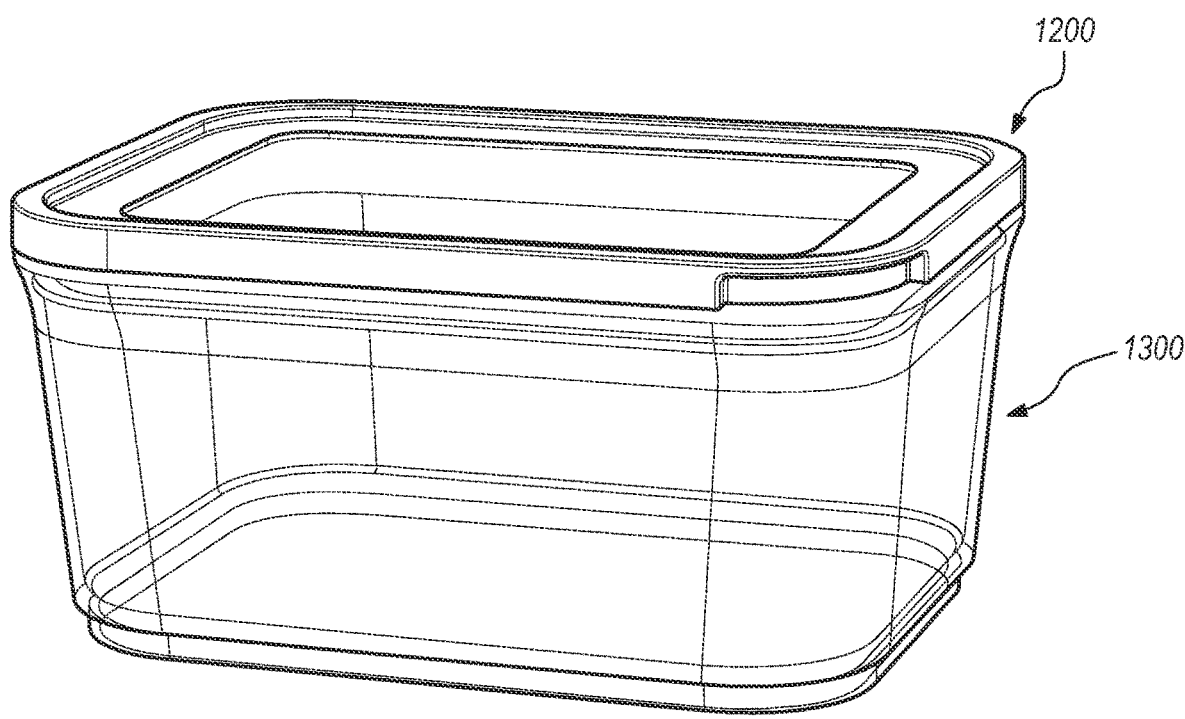
FIG. 16 illustrates an exemplary canister with the canister lid of FIG. 15, except that a central portion of the lid is transparent (it is opaque in FIG. 15).
Figure 23:
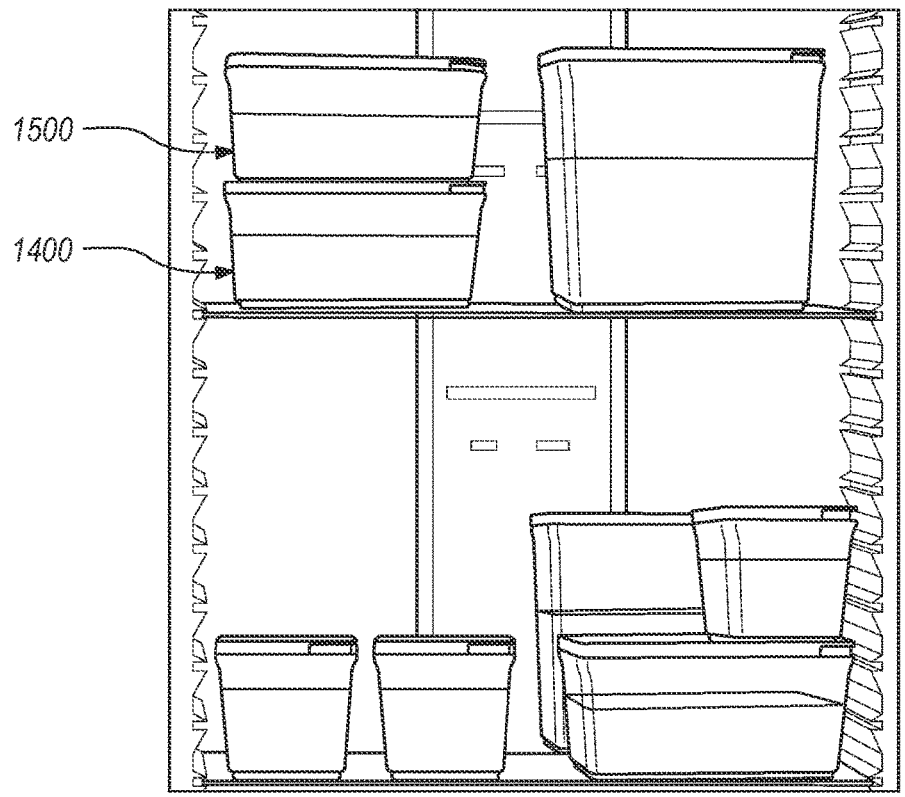
FIG. 23 illustrates various embodiments of canisters having exemplary canister lids according to exemplary embodiments.

Referring now to FIG. 23, various exemplary canisters having exemplary canister lids are shown. As shown in FIGS. 16 and 23, exemplary canisters 1300 are sized and configured to taper to be narrower at the bottom to fit within the annular rim of the lid below without the lid below gripping or tightly fitting the top canister, which facilitates easy stacking. Thus, the frame 1202 of the lid below provides a non-slip surface for the canister above but does not grip or tightly fit the top canister. In some exemplary embodiments, the lowermost part of annular lip 1304 (FIG. 17) of the canister above rests on the lid frame 1202 of the lid below touching the annular rim 1206 on at most two sides, e.g., in FIG. 15 annular lip 1304 could touch the left and upper sides of the annular rim 1206 but would not also touch the right or lower sides of the annular rim 1206 at the same time. Additionally, as shown in FIG. 23 and in U.S. Pat. Appl'n Ser. No. 29/739,183, in exemplary embodiments (and earlier embodiments), the canisters and lids can be sized and configured so that a smaller upper canister takes up, e.g., a half or a third of the lower larger lid, so that it engages the non-slip surface of one side of the lower lid.

Figure 24:
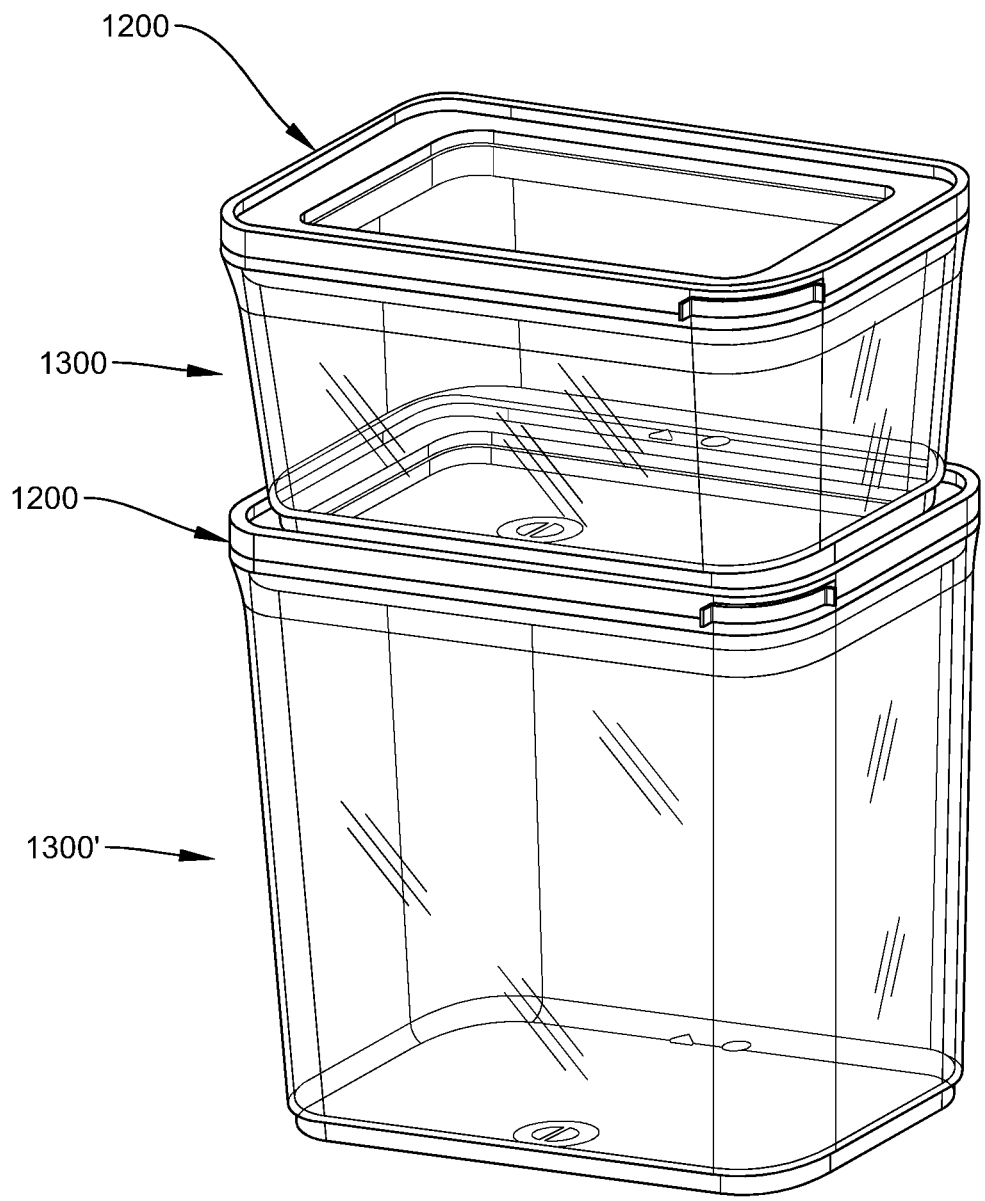
FIG. 24 is a front/right/top perspective view of two exemplary canisters and lids stacked in accordance with the embodiments of FIGS. 15-22.
Figure 25:
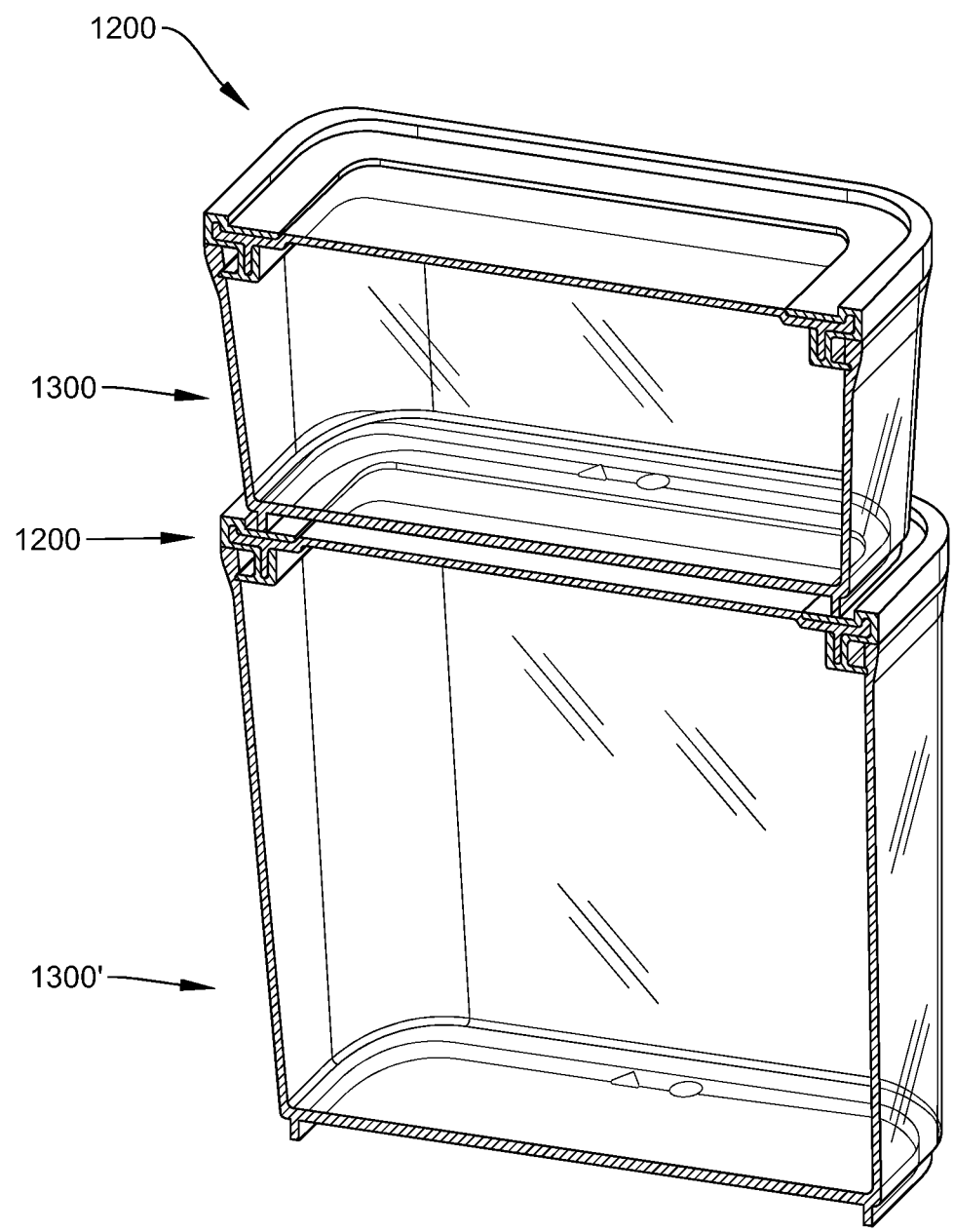
FIG. 25 is a front/right/top sectional perspective view of two exemplary canisters and lids stacked in accordance with the embodiments of FIGS. 15-22.
Figure 26:
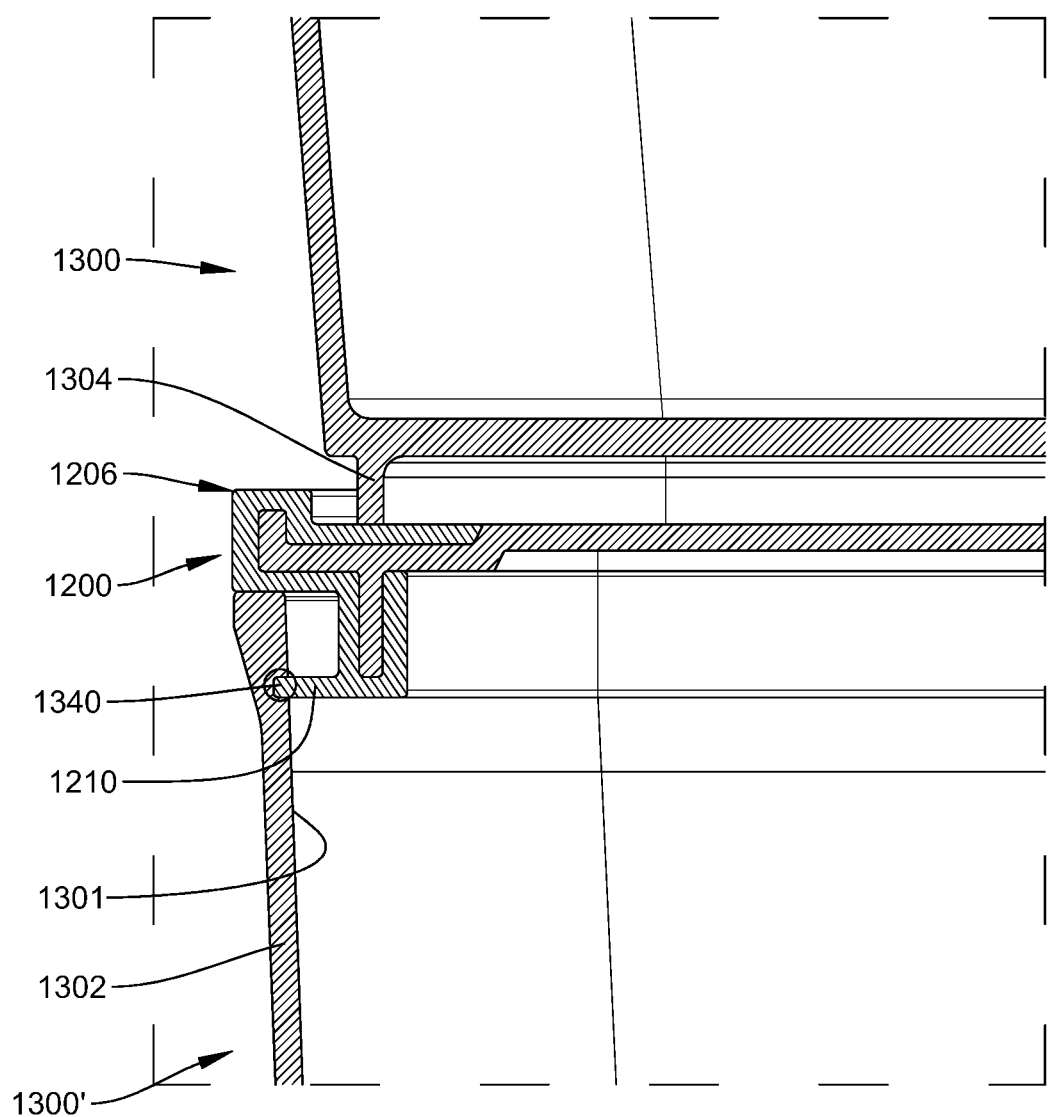
FIG. 26 is a front sectional elevational view of the upper canister on the lower lid and canister of FIGS. 24-25.

FIGS. 24-25 show two exemplary canisters 1300, 1300' and lids 1200 stacked in accordance with the embodiments of FIGS. 15-22. Canister 1300' is taller than canister 1300 but is otherwise the same as described above. FIG. 26 is a front sectional elevational view of the upper canister on the lower lid and canister of FIGS. 24-25. In exemplary embodiments, although the lower canister 1300' is taller, it tapers to the same footprint as the shorter, upper canister 1300; consequently, FIG. 26 would be the same if the positions of the two were to be switched (taller canister 1300' placed in top of the shorter canister 1300) (the upper sidewall angle in FIG. 26 would merely be slightly different because of the height of taller canister 1300'). FIG. 26 also shows an exemplary overlap between the distal end of flange 1210 and the inside surface 1301 of canister wall 1302. Of course, during actual use, the distal end of flange 1210 is deflected upwards to form a seal with the inside surface 1301 of canister wall 1302. When removed, the flange 1210 resumes the position of FIG. 26 (being made of TPE or a similar material).

As one of ordinary skill in the art would understand, the inventive concept shown in the exemplary embodiments of FIGS. 1-26 are applicable to storage canisters of various sizes. As illustrated, canisters of various dimensions can be used according to the desired footprint and storage volume. Thus, the invention is not limited to the dimensional relationships illustrated in the exemplary embodiments shown in the accompanying figures.

While the present invention has been illustrated by the description of embodiments thereof, and while the embodiments have been described in considerable detail, it is not the intention of the applicants to restrict or in any way limit the scope of the invention to such details. Exemplary kits include a plurality of the same lids and a corresponding plurality of different height canisters that taper down to the same footprint at the bottom and that use those lids so that they can stack in accordance with the current disclosure. The steps of methods herein may generally be performed in any order, unless the context dictates that specific steps be performed in a specific order. Additional advantages and modifications will readily appear to those skilled in the art. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

What is claimed is:

1. A lid to cover a first canister comprising:
    a body and an integral gasket, the gasket comprising an uppermost portion, a lowermost portion, and a plurality of connectors;
    wherein the uppermost portion of the gasket and a central portion of the lid are horizontal in use and substantially coplanar;
    wherein the uppermost portion of the gasket and the central portion of the lid together form a substantially flat, upwardly-facing horizontal surface within an upper depression, upon which a lowermost part of a second canister is capable of resting, and the gasket is capable of providing a non-slip interface between the canister lid and the lowermost part of the second canister;
    wherein a lip is formed on the lid body and is configured to define the upper depression, the upper depression being sized and configured to receive the lowermost part of the second canister such that canister lid does not grip the second canister when the second canister is placed on the canister lid;
    wherein the lid body comprises an upper surface and a lower surface;
    wherein the lid body has a plurality of first openings formed between the upper surface and the lower surface through which the plurality of connectors extend;
    wherein the plurality of connectors are disposed between the uppermost portion and the lowermost portion of the gasket;
    wherein the plurality of connectors connect the uppermost portion and the lowermost portion of the gasket through the plurality of openings formed in the lid; and
    wherein a lower surface of the lowermost portion of the gasket engages an uppermost edge of the first canister.

2. The lid of claim 1, wherein an upper portion of the lid body and the gasket are substantially contiguous.

3. The lid of claim 1, wherein the lower surface of the lid body comprises a recess formed adjacent to an edge of the lid body, the recess housing the lowermost portion of the gasket that engages the uppermost edge of the first canister.

4. The lid of claim 3, wherein the recess is formed by an outer wall located at the perimeter of the canister lid and an inner wall formed substantially parallel to the outer wall.

5. The lid of claim 4, wherein the inner wall is discontinuous.

6. The lid of claim 1, wherein an upper surface of the gasket is exposed at the upper surface of the lid body and a lower surface of the gasket is exposed within the recess.

7. The lid of claim 6, wherein the upper surface of the gasket is positioned adjacent to a lip formed on the body of the canister lid.

8. The lid of claim 1, wherein the gasket is formed of a material having a higher coefficient of friction than the material used to form the body of the canister lid.

9. The lid of claim 1, wherein a second opening is formed in the lid body, the second opening being configured to be opened and closed with a separate lid.

10. The lid of claim 9, wherein a hinged lid is affixed to the lid body for opening and closing the second opening, the hinged lid being configured to seal the second opening when the hinged lid is in a closed position.

11. The lid of claim 10, wherein a second gasket is disposed around the hinged lid for sealing the second opening when the hinged lid is in a closed position.

12. The lid of claim 1, wherein an opening is formed on the outer edge of the lid to create an opening portion, the opening portion being operable to remove the lid from the storage canister.

13. The lid of claim 1, wherein the lid further comprises a lid frame having a peripheral flange, the flange being configured to provide an airtight seal when the lid is pressed down onto the storage canister.

14. The lid of claim 1, wherein the lid and the second canister are sized and configured so that the second canister can be positioned on top of the lid to form a gap between the lip and the lowermost part of the second canister, the gap extending all the way around the lowermost part of the second canister.

15. A method of forming a lid for a storage canister comprising:
    positioning a lid into a mold, the lid comprising a plurality of openings between an upper and lower surface of the lid; and
    introducing a gasket material into the mold such that the gasket material forms a gasket having a lower portion with a lower surface and an upper portion with an upper surface, the gasket having a plurality of connectors disposed between the upper portion and the lower portion, wherein the plurality of connectors serve to connect the upper portion to the lower portion through the plurality of openings formed in the lid such that the upper portion and the lower portion of the gasket are held in position by the plurality of connectors,
    wherein the lid mold used to form the lid is configured such that the upper surface of the gasket and a central portion of the lid are horizontal in use and substantially coplanar within an upper depression of the lid; and
    wherein the lid mold used to form the lid is configured such that the gasket is exposed on an upper and lower portion of the molded lid.

16. The method of forming a lid of claim 15, further comprising forming a channel along at least a portion of a lower surface of the lid, the plurality of openings formed in the lid being positioned within the channel, and further comprising forming a recess in an upper surface of the lid into which the upper portion of the gasket is positioned.

17. A storage canister comprising:
    a canister which comprises:
        an upper sealing rim; and
        a base with a protrusion formed adjacent to the outer edge of the base and extending from a lower surface of the base;
    a lid which comprises:

a body and an integral gasket, the gasket comprising an uppermost portion, a lowermost portion, and a plurality of connectors;

wherein the uppermost portion of the gasket and a central portion of the lid are horizontal in use and substantially coplanar;

wherein an uppermost portion of the gasket and a central portion of the lid together form a substantially flat, upwardly-facing horizontal surface within an upper depression, upon which a lowermost part of a second canister is capable of resting, and the gasket is capable of providing a non-slip interface between the canister lid and lowermost part of the second canister;

wherein a lip is formed on the lid body and is configured to define the upper depression, the upper depression being sized and configured to receive the lower-most part of the second canister such that canister lid does not grip the second canister when the second canister is placed on the canister lid;

wherein the lid body comprises an upper surface and a lower surface;

wherein the lid body has a plurality of first openings formed between the upper surface and the lower surface through which the plurality of connectors extend;

wherein the plurality of connectors are disposed between the uppermost portion and the lowermost portion of the gasket;

wherein the plurality of connectors connect the uppermost portion and the lowermost portion of the gasket through the plurality of openings formed in the lid; and wherein a lower surface of the lowermost portion of the gasket engages the uppermost edge of the first canister.

18. The storage canister of claim 17, wherein the gasket is formed of a material having a higher coefficient of friction than the material used to form the base of the storage canister.

* * * * *